US009091069B2

(12) United States Patent
Marandos et al.

(10) Patent No.: US 9,091,069 B2
(45) Date of Patent: Jul. 28, 2015

(54) PLASTIC WALL PANEL

(71) Applicant: Aus Group Alliance Pty Ltd, Keyborough (AU)

(72) Inventors: Nicholas Marandos, East Malvern (AU); Ian John Walton, Dingley (AU); Graeme Peter Hall, Langwarren (AU); Graeme Francis Hisgrove, Brighton (AU)

(73) Assignee: Aus Group Alliance Pty Ltd, Keysborough, Victoria (AU)

( * ) Notice: Subject to any disclaimer, the term of this patent is extended or adjusted under 35 U.S.C. 154(b) by 0 days.

(21) Appl. No.: 13/799,274

(22) Filed: Mar. 13, 2013

(65) Prior Publication Data

US 2014/0097034 A1 Apr. 10, 2014

Related U.S. Application Data

(60) Provisional application No. 61/712,156, filed on Oct. 10, 2012.

(30) Foreign Application Priority Data

Oct. 16, 2012 (AU) .................................. 2012241161

(51) Int. Cl.
| | | |
|---|---|---|
| *E04B 2/28* | (2006.01) | |
| *E04B 2/42* | (2006.01) | |
| *E04B 1/84* | (2006.01) | |
| *E04C 2/34* | (2006.01) | |
| *B29C 39/08* | (2006.01) | |
| *E04F 13/09* | (2006.01) | |
| *E04B 2/88* | (2006.01) | |
| *E01F 8/00* | (2006.01) | |
| *B29C 41/06* | (2006.01) | |
| *B29C 41/38* | (2006.01) | |
| *E04B 2/00* | (2006.01) | |
| *E04B 1/74* | (2006.01) | |

(52) U.S. Cl.
CPC . *E04C 2/34* (2013.01); *B29C 39/08* (2013.01); *B29C 41/06* (2013.01); *B29C 41/38* (2013.01); *E01F 8/0011* (2013.01); *E01F 8/0023* (2013.01); *E04B 2/88* (2013.01); *E04F 13/09* (2013.01); *Y10T 29/49629* (2015.01)

(58) Field of Classification Search
USPC ............. 181/284, 285, 294, 210; 52/144, 145
See application file for complete search history.

(56) References Cited

U.S. PATENT DOCUMENTS 3,662,410 A * 5/1972 Lankheet .......................... 4/498
4,984,406 A 1/1991 Friesen (Continued)

FOREIGN PATENT DOCUMENTS

| EP | 2 466 010 | 6/2012 |
|---|---|---|
| WO | WO 00/42255 | 7/2000 |

OTHER PUBLICATIONS

QueenslandRail, Systems and Capability Technical Requirement, "*Design of Noise Barriers Adjacent to Railways*", Sep. 30, 2010.

*Primary Examiner* — Edgardo San Martin
(74) *Attorney, Agent, or Firm* — Knobbe Martens Olson & Bear LLP

(57) ABSTRACT

Embodiments relate generally to plastic wall panels. Wall panels are formed by rotational molding processes and may be used in sound attenuation barriers or other wall or building structures. Some embodiments include reinforcing structure. The reinforcing structure may be configured to effectively support a plastic shell of the wall panel in a way that allows some relative movement between the plastic shell and the reinforcing structure.

28 Claims, 16 Drawing Sheets

(56) References Cited

U.S. PATENT DOCUMENTS

| | | | | |
|---|---|---|---|---|
| 5,040,352 A | * | 8/1991 | Oberlander et al. | 52/786.11 |
| 5,150,993 A | | 9/1992 | Miller | |
| 5,217,771 A | * | 6/1993 | Schmanski et al. | 428/36.9 |
| 5,271,338 A | * | 12/1993 | Bonham | 108/161 |
| 5,272,284 A | * | 12/1993 | Schmanski | 181/210 |
| 5,372,866 A | * | 12/1994 | Oberlander et al. | 428/110 |
| 5,560,630 A | | 10/1996 | Phares et al. | |
| 5,702,090 A | * | 12/1997 | Edgman | 256/19 |
| 6,180,203 B1 | | 1/2001 | Unkles | |
| 6,412,597 B1 | * | 7/2002 | Schola et al. | 181/290 |
| 6,637,728 B2 | | 10/2003 | Pettit et al. | |
| 6,719,277 B2 | * | 4/2004 | Ohanesian | 256/19 |
| 7,220,077 B2 | * | 5/2007 | Humphries et al. | 404/6 |
| 7,240,637 B2 | * | 7/2007 | Rosen | 119/524 |
| 7,478,797 B2 | * | 1/2009 | Laws et al. | 256/19 |
| 7,665,574 B2 | * | 2/2010 | Schoela et al. | 181/210 |
| 7,726,633 B2 | * | 6/2010 | Cook et al. | 256/19 |
| 7,739,846 B2 | | 6/2010 | Garrett | |
| 8,161,711 B2 | * | 4/2012 | Steed et al. | 52/782.1 |
| 8,511,648 B2 | * | 8/2013 | McCarthy et al. | 256/67 |
| 8,561,360 B2 | * | 10/2013 | Corbin, Jr. | 52/144 |
| 8,579,080 B2 | * | 11/2013 | Angelico | 181/293 |
| 8,651,232 B2 | * | 2/2014 | Kedar et al. | 181/289 |
| 2001/0009703 A1 | * | 7/2001 | Toshikawa | 428/35.7 |
| 2003/0019170 A1 | * | 1/2003 | Donnelly | 52/144 |
| 2004/0045488 A1 | * | 3/2004 | Danzik et al. | 108/161 |
| 2004/0121100 A1 | | 6/2004 | Potempa | |
| 2007/0131480 A1 | * | 6/2007 | Corbin et al. | 181/210 |
| 2007/0158629 A1 | | 7/2007 | Laws et al. | |

* cited by examiner

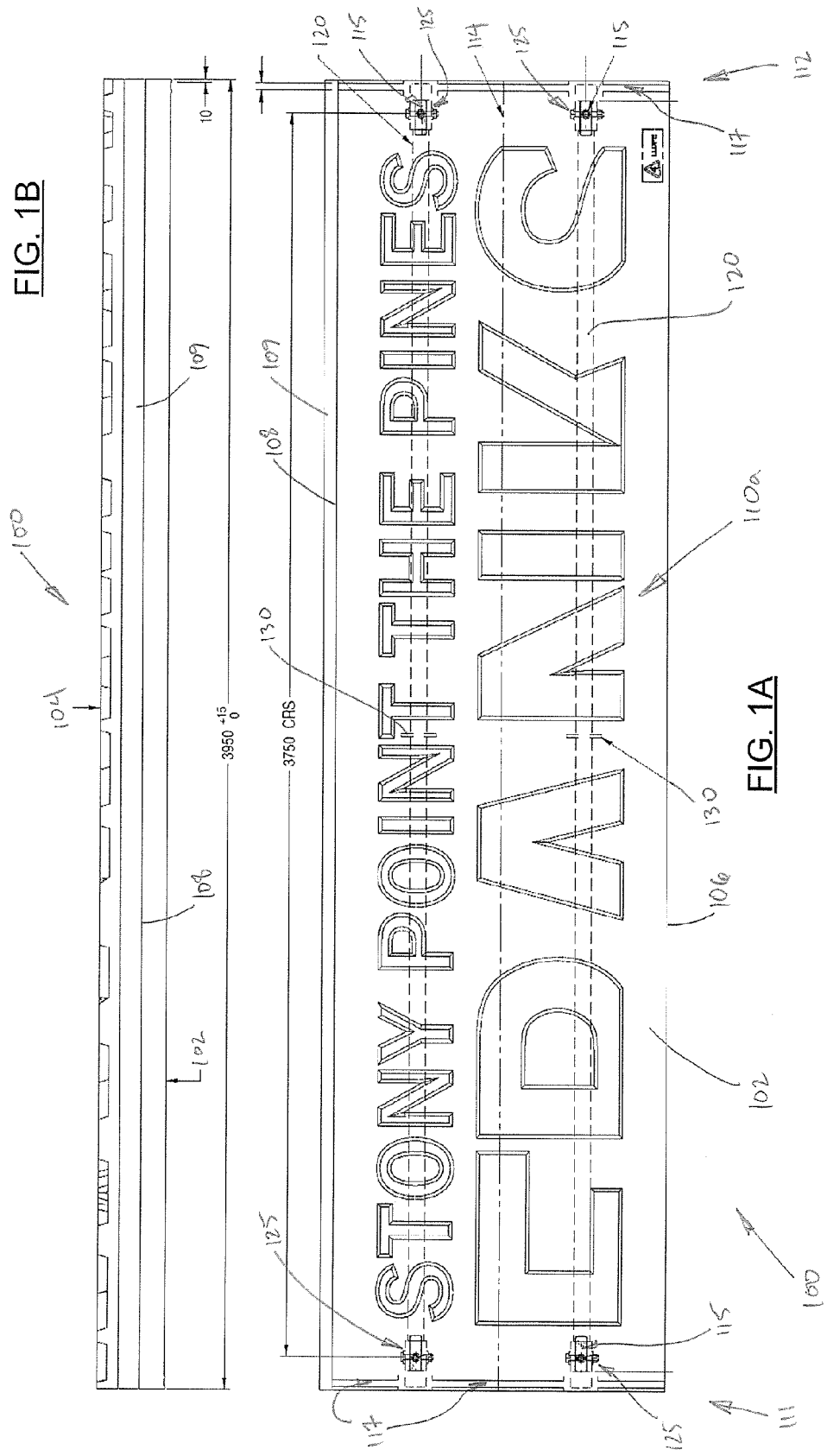

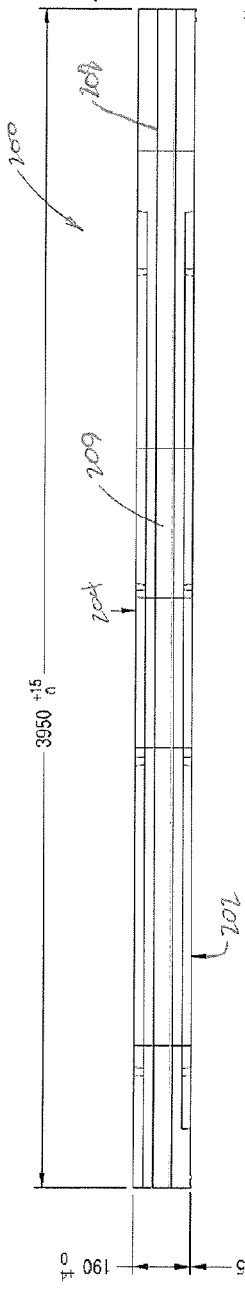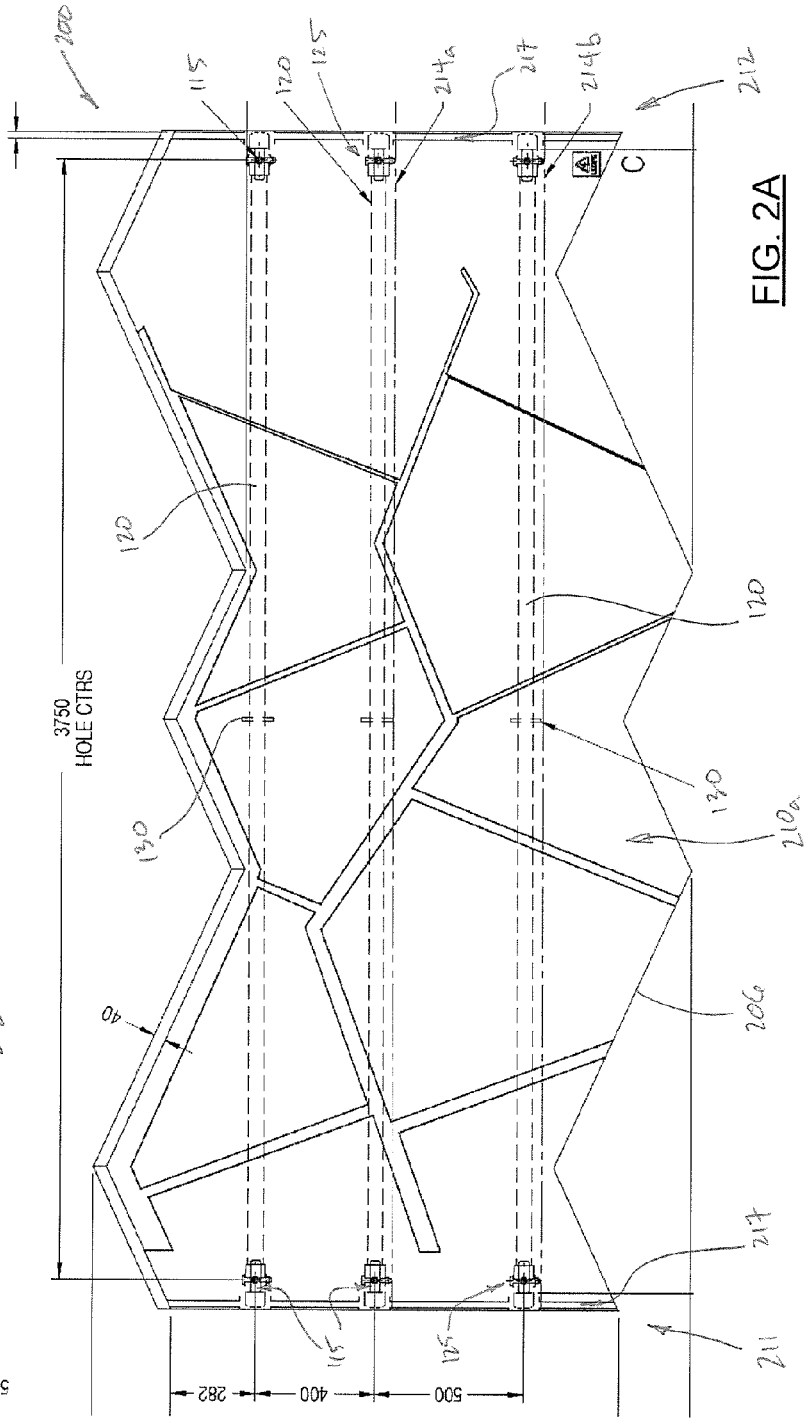

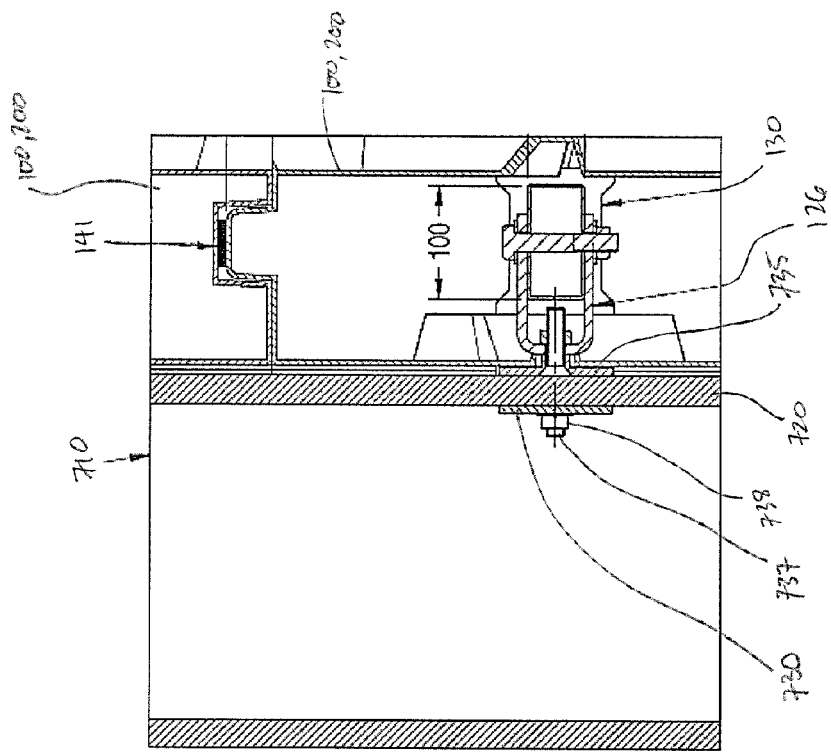
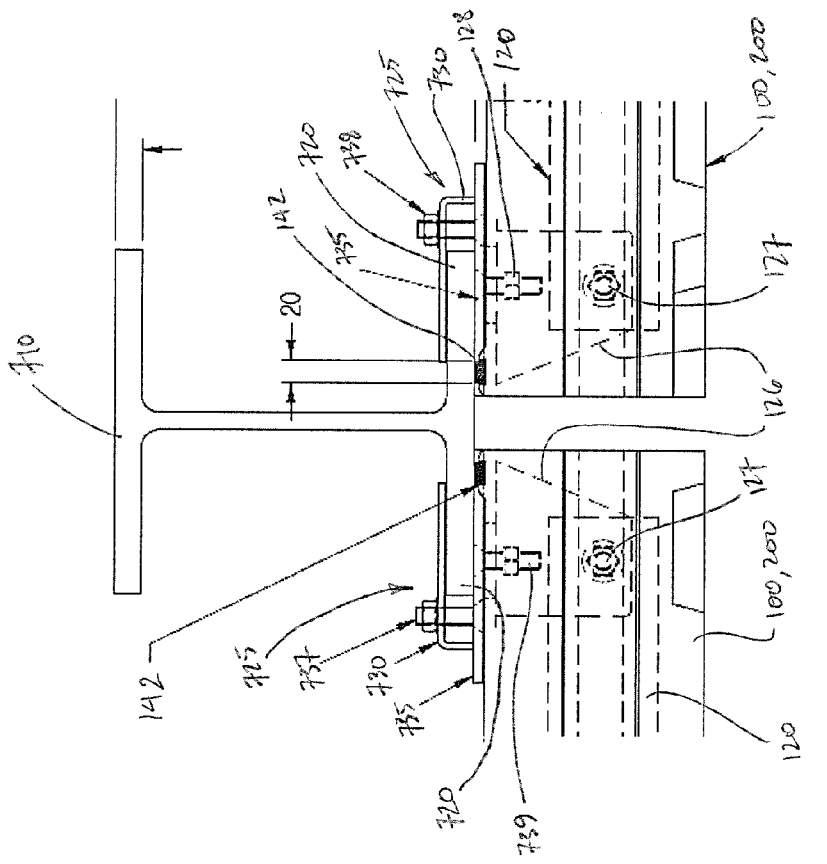
FIG. 11
FIG. 10

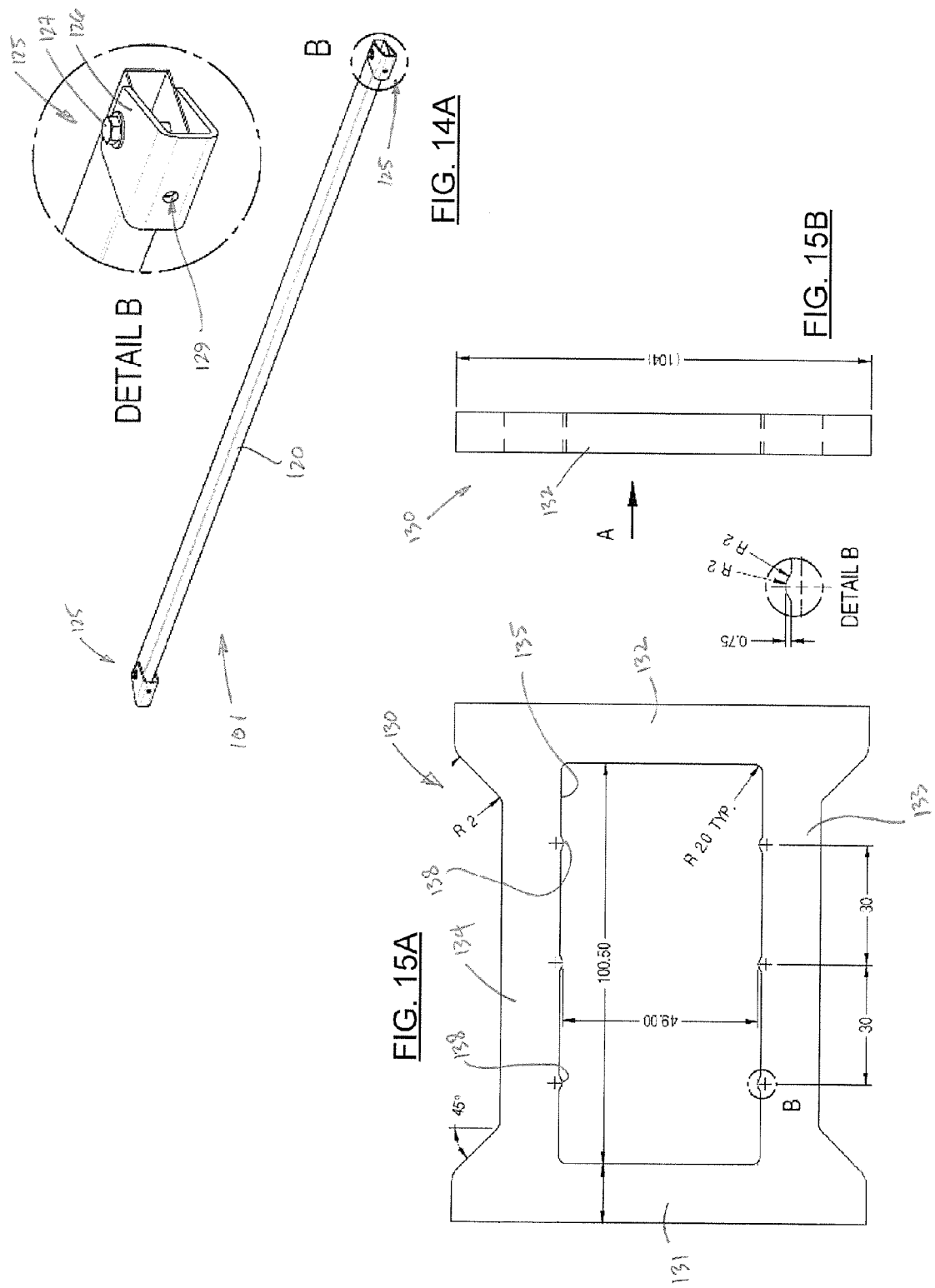

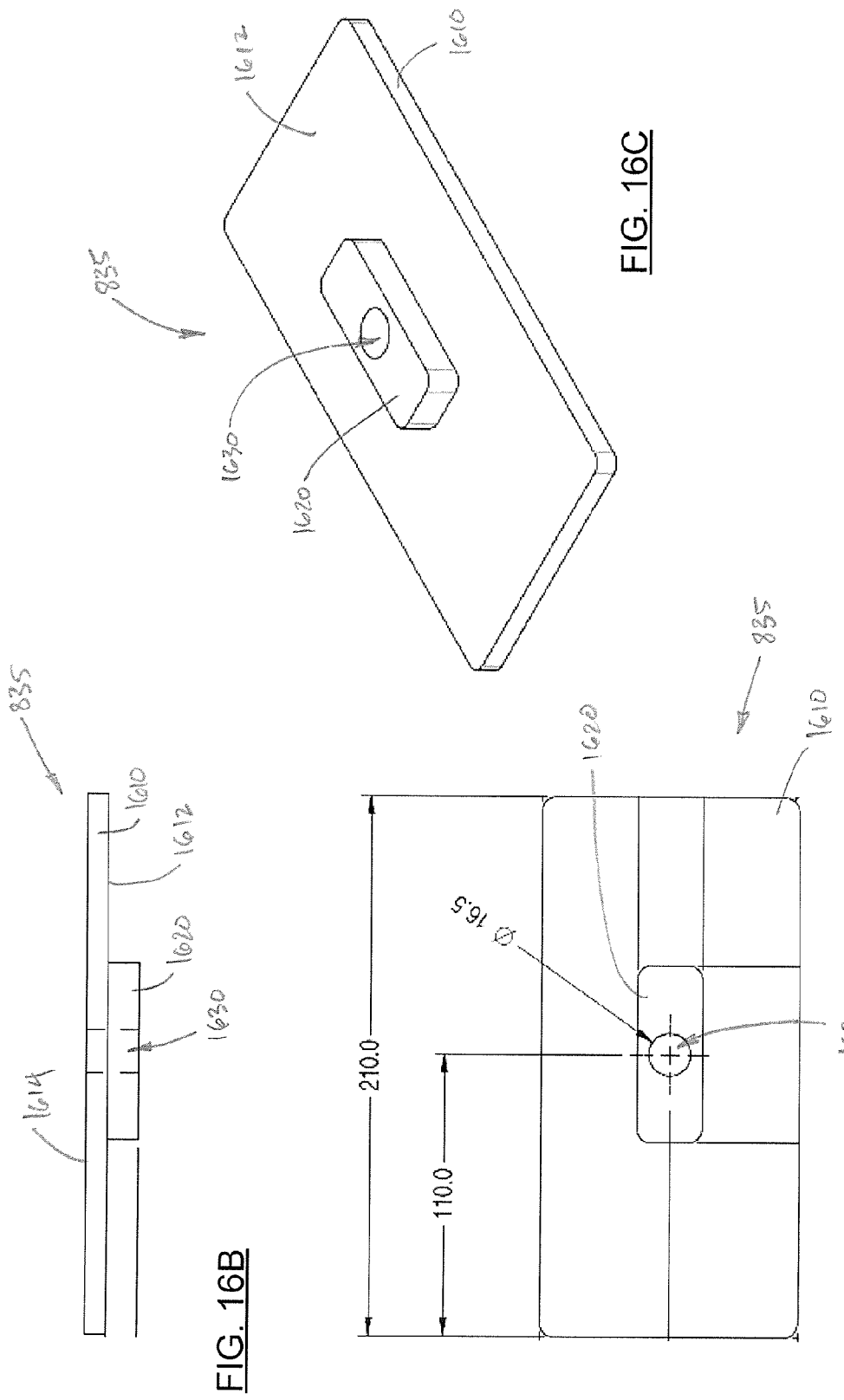

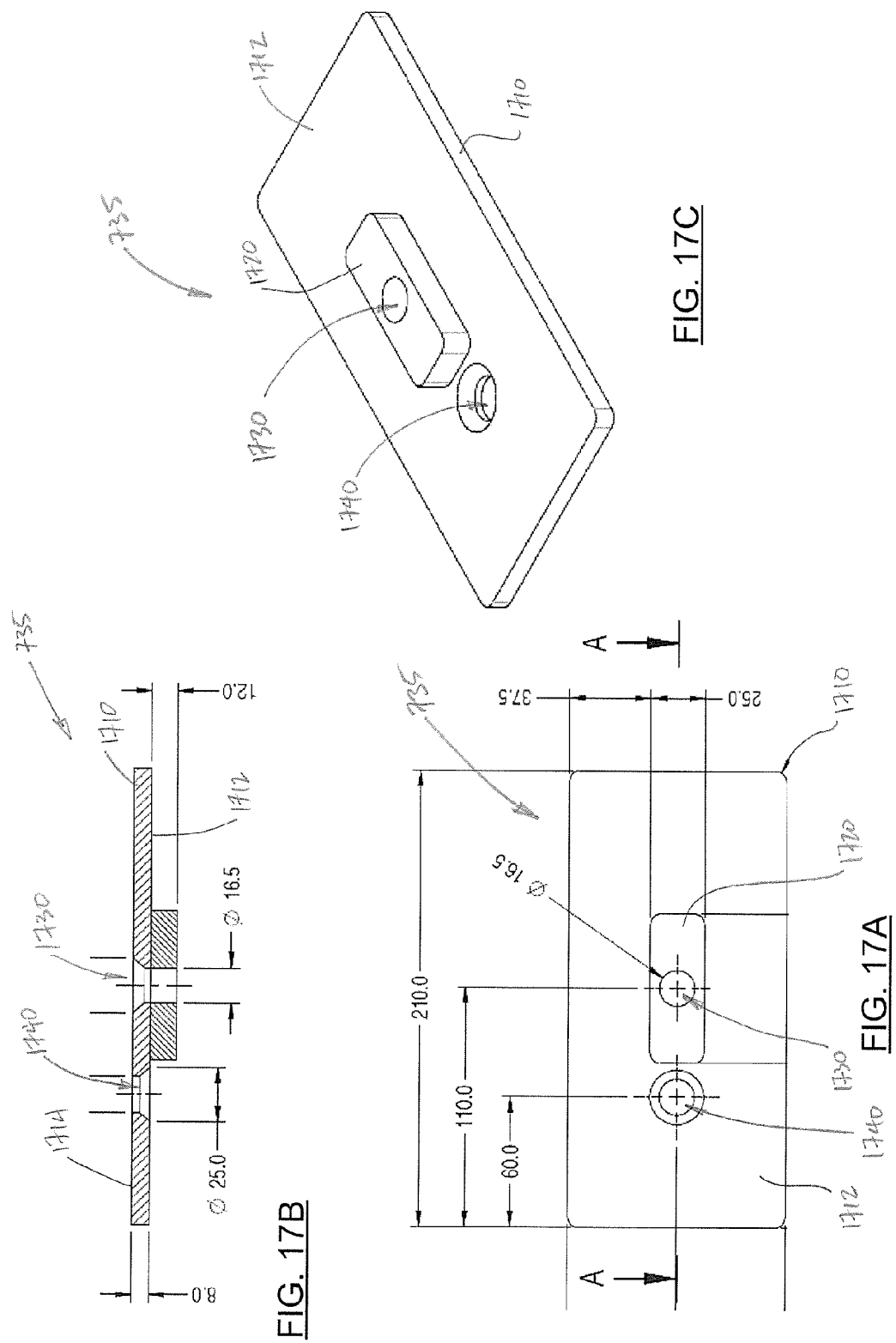

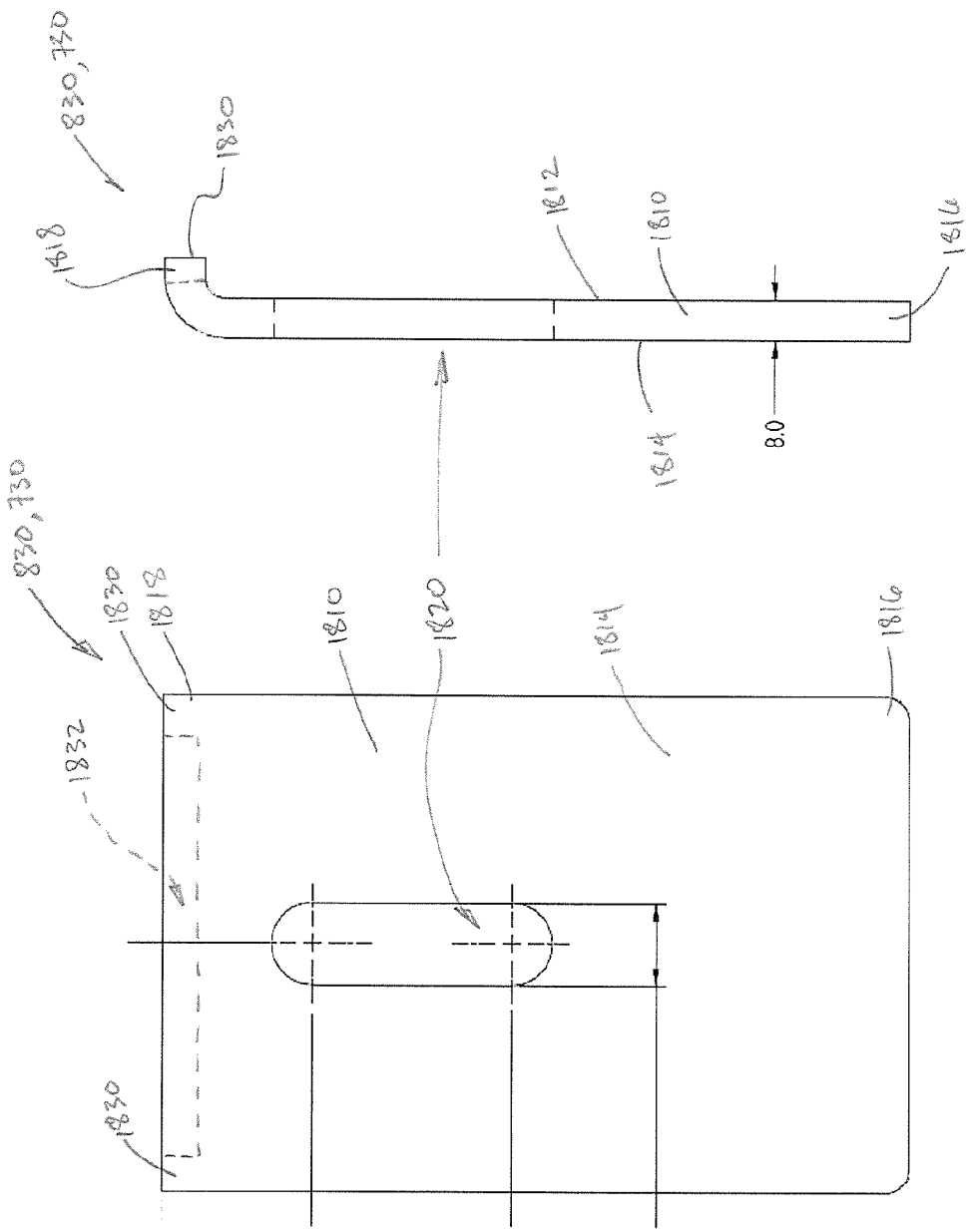

PLASTIC WALL PANEL

CROSS-REFERENCE TO RELATED APPLICATIONS

The present application claims priority benefit of U.S. Provisional Patent App. No. 61/712,156, filed Oct. 10, 2012, and claims priority to Australian Patent App. No. 2012241161, filed Oct. 16, 2012, the contents of each of which are hereby incorporated by reference in their entirety.

TECHNICAL FIELD

The described embodiments relate generally to plastic panels and methods of their formation. In particular, embodiments relate to plastic panels suitable for use in sound attenuation barriers or other wall structures. The plastic panels may be generally hollow, with reinforcing structure inside.

BACKGROUND

Sound attenuation barriers are used internationally to attenuate the transmission of noise from a noisy area, such as a roadway, industrial site or other high noise area. Such barriers are generally used to provide a certain specified degree of attenuation of noise passing from one side of the barrier to the other.

Sound attenuation barriers commonly include support structure anchored to the ground and a series of panels spanning the support structure to provide a continuous barrier along a desired distance. In some instances, such sound attenuation barriers extend for a number of kilometers. Commonly, the panels used in existing sound attenuation barriers are formed of wood, concrete and/or steel. These panels are formed at a remote site, transported to the place where the barrier is to be erected, then affixed relative to the support structure to form the sound attenuation barrier. Steel panels are heavy and expensive and subject to graffiti. Wood panels are subject to burning, are more prone to deterioration and need significant maintenance. Concrete panels are quite heavy and can be prone to cracking or chipping. As sound attenuation barriers may provide an aesthetically appealing appearance, cracking or chipping of the panels may be undesirable and the panel manufacturer may be asked to replace any such damaged panel at its own cost. Concrete panel forming processes may provide only limited flexibility to confer an appealing aesthetic appearance on an external face of the panel.

Another problem encountered in relation to sound attenuation barriers is the potential for vandalism, such as spray painted graffiti. Removal of graffiti from concrete panels can be problematic and expensive. Similarly, where a sound attenuation barrier is adjacent an area that throws up air-born particulate, such as a roadway, airborne pollutants commonly accrete onto the panels over time and need to be cleaned in order maintain an aesthetically pleasing appearance. For some panel materials, it can be hard to clean the pollutants from the panel surfaces.

Throughout this specification the word "comprise," or variations such as "comprises" or "comprising," will be understood to imply the inclusion of a stated element, integer or, step, or group of elements, integers, or steps, but not the exclusion of any other element, integer, or step, or group of elements, integers, or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a rotational-molded plastic sound attenuation barrier panel, the panel defining an internal cavity and comprising reinforcing structure disposed in the cavity.

The reinforcing structure may comprise at least one reinforcing element. The at least one reinforcing element may comprise at least one elongate bar. The at least one reinforcing element may comprise two reinforcing elements. The two reinforcing elements may be substantially parallel. The at least one reinforcing element may be disposed to extend substantially parallel to a longitudinal axis of the panel. The reinforcing structure may comprise metallic reinforcing structure.

The panel may comprise coupling structure to couple the panel to support structure. The coupling structure may comprise at least one internal interface component that is coupleable to a respective clamp. The coupling structure may comprise mating structure to mate with mating structure of an adjacent panel.

The panel may comprise a textured external surface on at least one side face. The panel may comprise textured external surfaces on first and second opposed side faces. The at least one textured external surface may be textured to have a stone appearance. The textured external surface may comprise a visually discernible pattern. The textured external surface may at least partially define (e.g., define) one or more symbols. The one or more symbols may at least partially define (e.g., define) one or more words.

The panel may further comprise at least one spacer to separate the reinforcing structure from side walls of the panel. The panel may comprise a shell, the shell being formed of at least one polyolefin material suitable for rotational molding. The panel may be configured to accommodate thermal expansion and/or contraction of the shell relative to the reinforcing structure.

The panel may have a length greater than a height and a width less than the height when the panel is erected as part of a sound attenuation barrier. The length may be between about two meters and about four meters. The length may be about four meters, in some embodiments.

Attenuation of sound through the panel may be at least about 25 decibels at frequencies between about 250 Hz and about 5000 Hz (e.g., between 250 Hz and 5000 Hz).

At least one long edge of the panel may be linear. At least one long edge of the panel may be non-linear. In some embodiments, both long edges are linear or non-linear, while in some embodiments, there may be one linear long edge and one non-linear long edge.

Some embodiments relate to a sound attenuation barrier, comprising:
  at least one of the panels as described herein; and
  support structure to support the at least one panel in a vertical orientation.

The support structure may comprise a plurality of anchored support beams and wherein each at least one panel is clamped to at least one support beam. The at least one panel may be supported in relation to the support beams to allow movement of at least part of the panel relative to the support beams in response to environmental conditions. Each support beam may be flanged and each panel is coupled to flanges of two support beams.

Some embodiments relate to a hollow plastic wall panel having a length, a height and a width, the length being greater than the height and the height being greater than the width, the panel defining a cavity and comprising at least one reinforcement component extending within the cavity, wherein the panel further at least partially defines (e.g., defines) at least one aperture in a wall of the panel to allow communication of an attachment mechanism through the respective aperture for coupling the panel to a support structure.

The panel may be formed by rotational molding and a plastic used to form the panel is a polyolefin suitable for rotational molding. Each reinforcement component may comprise an elongate bar extending in a lengthwise direction of the panel and a pivotable coupling element at each opposite end of the bar. The panel may be coupleable to the support structure by coupling of one attachment mechanism through a respective aperture to one pivotable coupling element.

Some embodiments relate to a method of forming a sound attenuation barrier panel, comprising:
  receiving a quantity of granulated polyolefin in a mold that at least partially defines (e.g., defines) a shape of the panel;
  fixedly positioning reinforcing structure in the mold; and
  forming the granulated polyolefin into panel walls by rotational molding, wherein the panel forms around the reinforcing structure.

The mold may be formed to at least partially define (e.g., define) a textured external surface on at least one outward face of the panel. The textured external surface may at least partially define (e.g., define) one or more symbols. The forming of the panel may comprise forming at least one aperture in the panel to facilitate coupling of the panel to support structure. The panel may be formed to allow communication of a coupling mechanism through each aperture to couple the panel to the support structure so that load and stresses on the panel are transferred to and primarily born by the reinforcing structure.

The method may further comprise inserting spacers into the mold to space the reinforcing structure from internal surfaces of the mold. The spacers and reinforcing structure may be arranged to permit relative movement therebetween. The spacers may be formed of a rigid material that is chemically compatible with the polyolefin material of the panel walls to facilitate bonding of the spacers with the panel walls. In some embodiments, the spacers may be formed of a non-plastic material, such as a metal like aluminum and/or steel.

The panel may be formed to have mating structure to mate with mating structure of an adjacent panel in a sound attenuation barrier.

Some embodiments relate to a method of forming a sound attenuation barrier, comprising:
  positioning plural sound attenuation barrier panels as described herein adjacent anchored support structure; and
  affixing each sound attenuation barrier panel to the support structure.

The affixing may comprise clamping each sound attenuation barrier panel to the support structure without penetrating the support structure.

Some embodiments relate to a sound attenuation barrier comprising:
  at least one hollow plastic panel;
  support structure to support at least one panel in a vertical orientation as a wall element; and
  a coupling system that couples an internal structural element of the at least one panel to the support structure so that the at least one panel is permitted to move relative to the support structure in response to environmental conditions.

Some embodiments relate to a rotational molded plastic sound attenuation barrier panel, the panel having a length, a height and a width, the length being greater than the height and the height being greater than the width, wherein the length is about four meters. In this context, about four meters is intended to include lengths slightly more or less than four meters, such as about 5 cm to about 10 cm more or less than four meters. In some embodiments, the length may be more than 4 meters, for example up to about 5 meters or up to about 6 meters.

The height may be between about 0.5 meters and about 3 meters, for example. The width may be between about 180 millimeters and about 210 millimeters, for example. The panel may have straight side edges along its length. Alternatively, the panel may have non-linear side edges along its length. The panel may further comprise lengthwise reinforcing means.

Some embodiments relate to a cladding for a building, comprising support structure and a plurality of the wall panels described herein, wherein the wall panels are coupled to the support structure to form at least part of the cladding.

Some embodiments relate to a building exterior, comprising support structure and a plurality of the wall panels described herein, wherein the wall panels are coupled to the support structure to form at least part of the building exterior.

BRIEF DESCRIPTION OF THE DRAWINGS

Embodiments are described in further detail below, by way of example, with reference to the accompanying drawings, in which:

FIG. 1A is an elevation view of a vertically oriented panel according to some embodiments;

FIG. 1B is a plan view of the panel of FIG. 1A;

FIG. 2A is an elevation view of a panel according to further embodiments, shown in a vertical orientation;

FIG. 2B is a plan view of the panel of FIG. 2A;

FIG. 10 is a view looking upward from the bottom of part of the barrier of FIG. 7, illustrating coupling of two panels to a support beam;

FIG. 11 is a cross-sectional view through part of the sound attenuation barrier of FIG. 7, illustrating internal panel detail and coupling of the panel to a support beam;

FIG. 14A is an isometric view of a reinforcing component disposed within each panel;

FIG. 15A is a side view of a spacer element to be positioned in each panel;

FIG. 15B is an end view of the spacer element of FIG. 15A;

FIG. 16A is a plan view of a locating plate for use in coupling a panel to a support beam;

FIG. 16B is one side view of the locating plate of FIG. 16A;

FIG. 16C is an isometric view of a locating plate of FIG. 16A;

FIG. 17A is a plan view of an alternative locating plate for use in coupling a panel to a support beam;

FIG. 17B is a sectional view of the locating plate of FIG. 17A, taken along line A-A of FIG. 17A;

FIG. 17C is an isometric view of the locating plate of FIG. 17A;

FIG. 18A is a plan view of a clamping plate for using coupling a panel to a support beam;

FIG. 18B is a side view of the clamping plate of FIG. 18A;

DETAILED DESCRIPTION

Figure 1D:
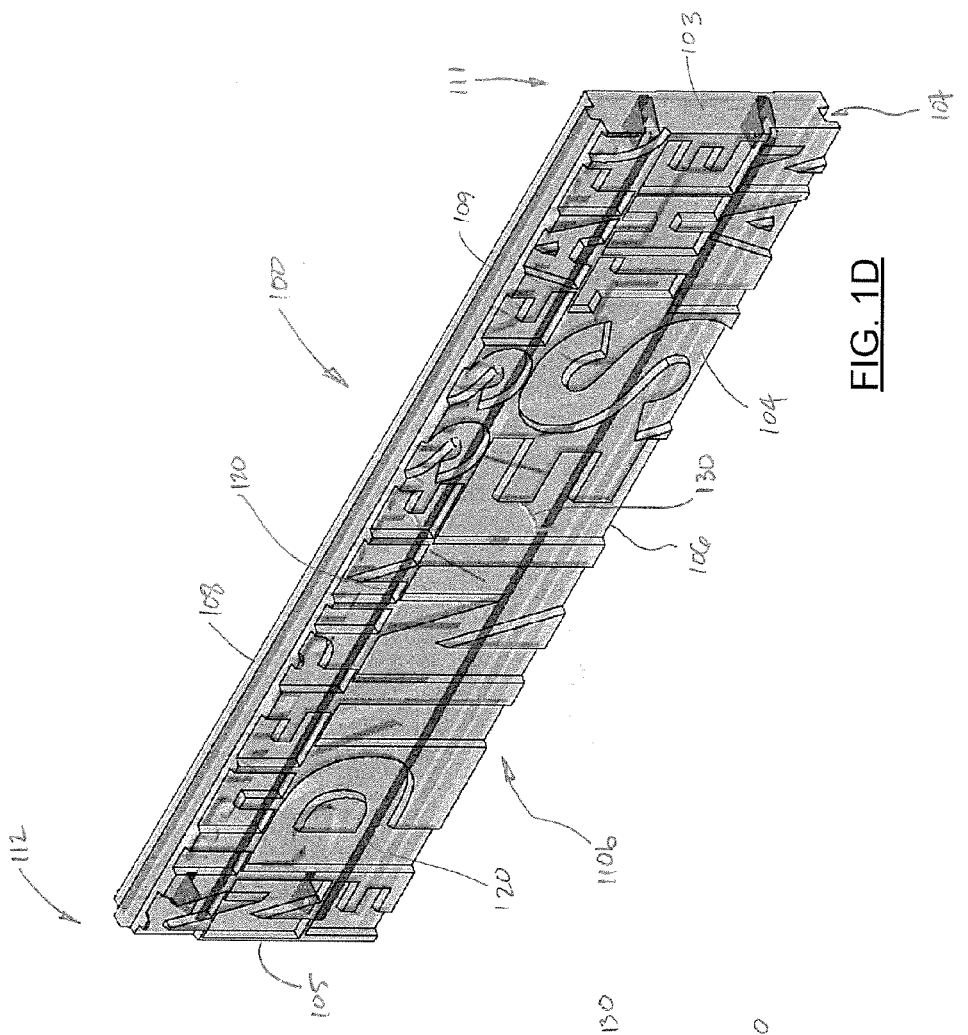
FIG. 1D is an isometric view of the panel of FIG. 1A, seen from an opposite side.
Figure 1C:
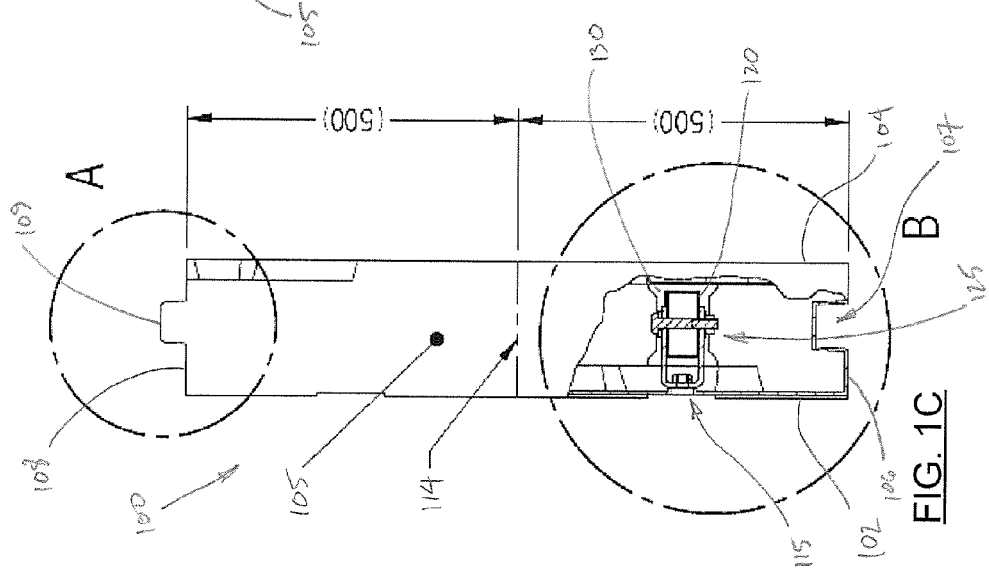
FIG. 1C is an end view of the panel of FIG. 1A, showing some internal detail of the panel in partial cut-away and partial cross-section.

Described embodiments relate generally to plastic panels and methods of their formation. In particular, some embodiments relate to plastic panels suitable for use in sound attenuation barriers and/or other wall structures. The plastic panels may be generally hollow, with reinforcing structure inside.

Described panels may be formed by rotational molding techniques using existing rotational molding technology. Such techniques generally involve formation of a mold, addition of plastic granules into the mold, closure of the mold, and then simultaneous rotation and heating of the plastic inside the closed mold in order to melt the plastic evenly around the heated surfaces of the mold. Use of rotational molding techniques in the context of forming embodiments of plastic panels is described herein in more detail in relation to FIG. 19 below.

Referring now to FIGS. 1A, 1B, 1C, 1D, 3, 4, 5, and 6, a panel 100 according to some embodiments will now be described in further detail. Panel 100 comprises a front side face 104, a back side face 102, a first end face 103 at a first end 111, a second end face 105 (substantially parallel to the first end face 103) at a second end 112, a bottom edge 106, and a substantially parallel top edge 108. The bottom edge 106 is contoured to at least partially define (e.g., define) a groove 107 and the top edge 108 is contoured to provide a correspondingly shaped tongue 109. Using corresponding tongues 109 and grooves 107, multiple panels 100 can be stacked one on top of another, with the tongues 109 and grooves 107 of the panels 100 providing mating structure for forming a stable wall. The thickness of the walls of panel 100 is nominally about 8 millimeters, although some small variation may occur across the different parts of the panel walls. Other panel embodiments may use a different nominal wall thickness, such as about 6 millimeters to about 10 millimeters, for example.

The front face 104 may be formed to have a textured external surface 110a. The textured external surface 110a may have a stone appearance and may comprise a visually discernible pattern, such as geometric shapes and/or one or more symbols and/or parts of symbols. The one or more symbols may at least partially define (e.g., define) one or more words or may convey a specific meaning, for example. Similarly, back face 102 may be formed to have a textured external surface 110b. Like the textured external surface 110a, surface 110b may have a stone appearance and may comprise a visually discernible pattern, such as one or more symbols and/or parts of symbols. Such symbols and/or parts of symbols may at least partially define (e.g., define) one or more words and/or convey specific meanings. Formation of panel 100 by rotational molding allows the creation of varied visually aesthetically appealing and/or meaningful indicia and/or patterns to be provided on external exposed front and back faces 104, 102 of the panel 100, which may provide added appeal in some circumstances.

Each panel 100 has a length greater than its height and a height greater than its width when the panel 100 is oriented vertically in a normal vertical wall panel orientation as shown in FIGS. 1A and 1D. The length of panel 100 may be about, or just under, 4 meters (e.g., 390 cm to 395 cm, 395 cm to 400 cm, 390 cm to 400 cm), while the height may be about one meter, not including a height of the vertically extending tongue 109. In some embodiments, the height of the panel 100 may be up to about two meters or possibly up to about three meters. The height of the tongue 109 relative to the remainder of the top edge 108 may be about 40 millimeters to about 50 millimeters, for example. The width of the panel 100 may be about 180 millimeters to about 210 millimeters, for example. Specific embodiments may have a width of about 190 millimeters or about 200 millimeters.

The example dimensions given here may be varied, depending upon specifications and are intended to only be generally indicative of the dimensions of some embodiments. Other embodiments can have different dimensions. For example, the panel length may be shorter, in the order of 2, 3, or 3.5 meters or other lengths in between about 2 meters and about 4 meters. The panel length may alternatively be longer than 4 meters, for example up to about 5 meters or up to about 6 meters. Panels of such longer lengths include suitable reinforcing structure, such as is described herein, in order to tolerate high wind loads.

In the context of this application, given that the plastic panels described herein are subject to thermal expansion and contraction and may also experience some degree of flexion, the term "about" applied to a dimension of a structural component should be understood to include dimensions in a range, such as an absolute range or a percentage range like 1%, 2%, 3%, 4%, 5%, or 10% on either side the specified dimension. For example, a length of "about four meters" may be understood to include lengths in the range of 50-100 mm more or less than four meters, which equates to a percentage range of 1.25-2.5.

Figure 14D:
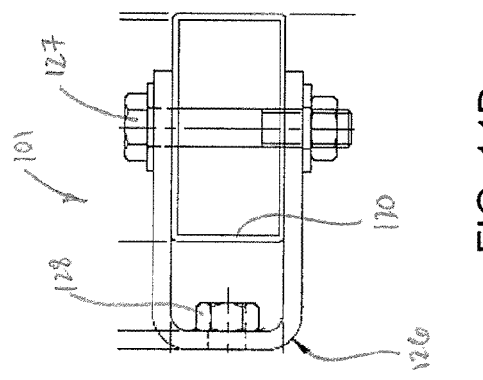
FIG. 14D is an end view of the reinforcing component of FIG. 14A.
Figure 14B:
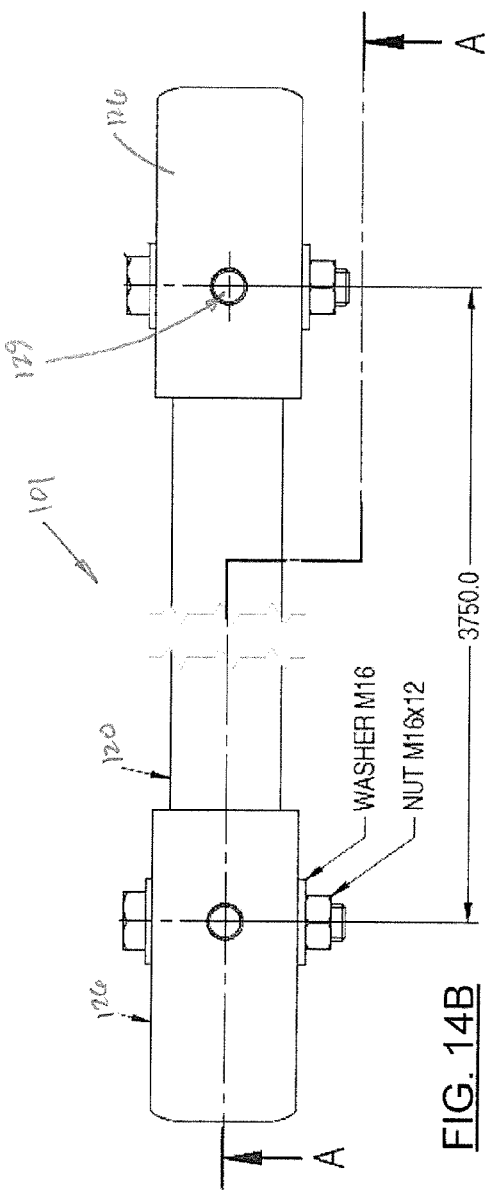
FIG. 14B is a partial side rear elevation view of the reinforcing component of FIG. 14A.
Figure 14C:
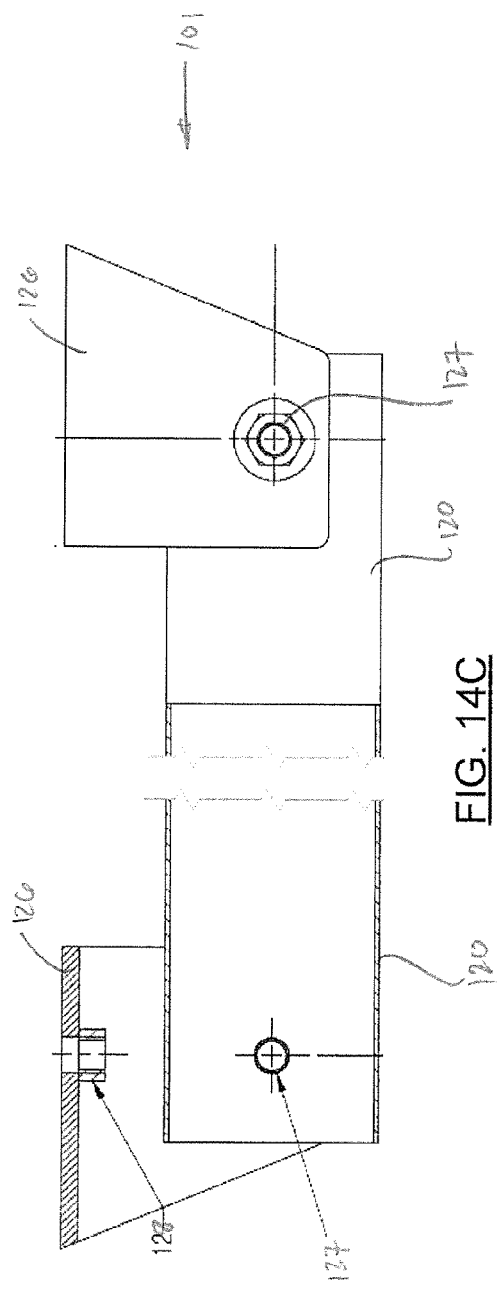
FIG. 14C is a partial cross-sectional view of the reinforcing component of FIG. 14A, taken along line A-A of FIG. 14B.

Described panel embodiments may employ reinforcing structure, for example including one or more reinforcing elements or components 101 (FIG. 14A). Such reinforcing structure may comprise a number of strengthening or reinforcing elements, including for example: rigidifying variations in surface patterns; inwardly extending molded wall portions that may touch or be bonded together; and one or more relatively rigid reinforcing elements that extend within a cavity at least partially defined (e.g., definde) by the walls of the panel 100. Such reinforcing elements may comprise plastic components, metal components, combinations thereof, and the like.

The panel 100 has a longitudinal center-line 114 that may be considered to form a longitudinal axis of the panel 100. In some embodiments, panel 100 may be formed to have a height roughly half of that shown in FIG. 1A, with the bottom or top of the half panel coinciding with the center-line 114 shown in relation to panel 100. Such a half panel may comprise only one reinforcing component 101.

For embodiments of panel 100 needing strong structural integrity in order to be able to withstand high wind loadings, reinforcing components 101 may be used. Such reinforcing components 101 are included within the mold during the rotational molding process, so that a shell comprising the outer walls of the panel 100 forms around the reinforcing components 101 during the rotational molding. In some embodiments, only one reinforcing component 101 is needed, while in some embodiments, 2, 3, 4, 5, or perhaps more reinforcing components 101 may be positioned within the internal cavity at least partially defined (e.g., defined) by the walls of the panel 100.

Figure 7:
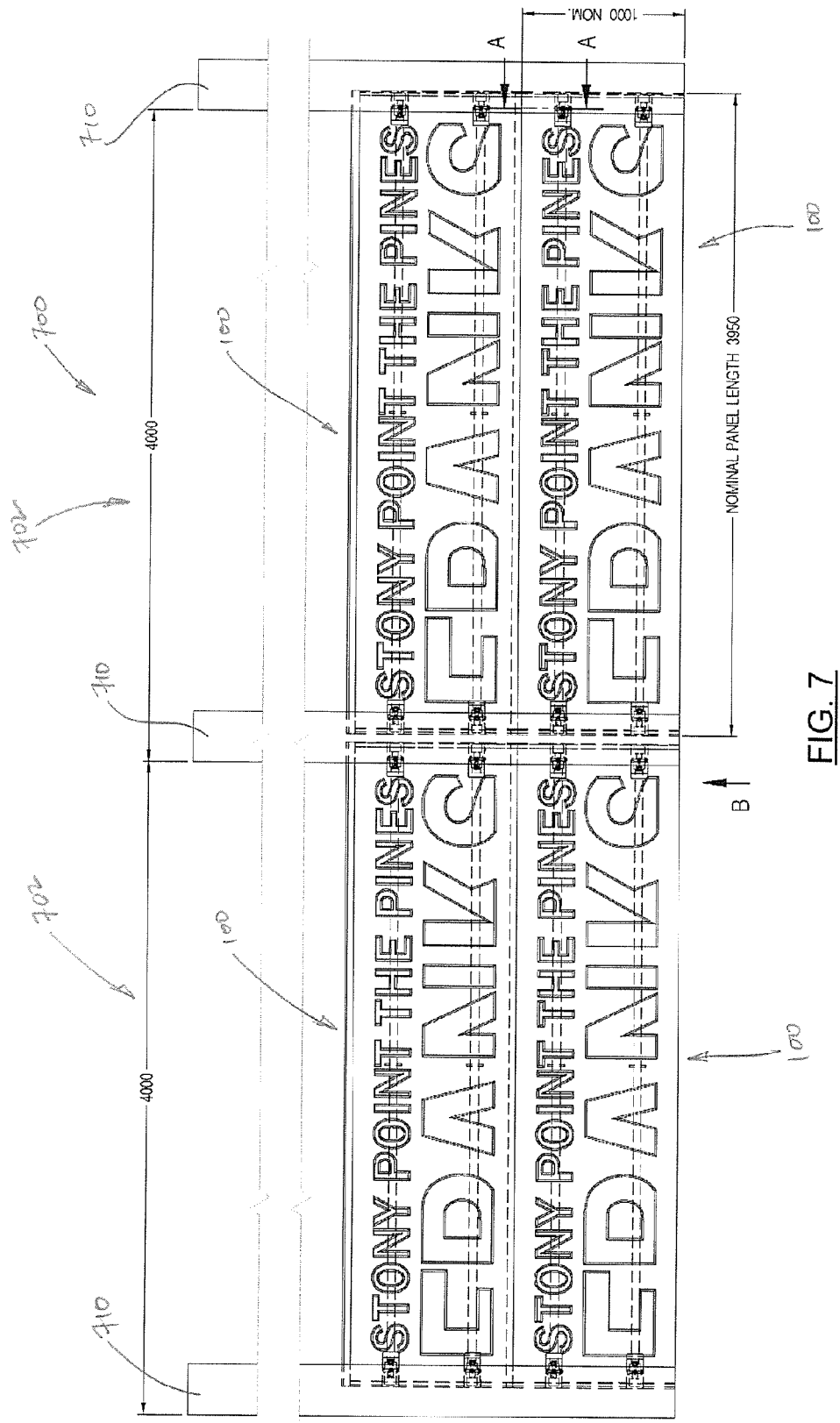
FIG. 7 is a front elevation view of a sound attenuation barrier including multiple panels according to FIG. 1A, as an example of panels that can be used in the barrier.

Each panel 100 is formed to have at least one aperture in at least one of the walls. The panel 100 may have multiple apertures formed to allow communication between internal and external spaces of the panel 100. At least one such aperture may be positioned to allow communication of a coupling mechanism through the aperture to couple internal structures of the panel 100 to external support structure. For example, panel 100 may have an aperture 115 formed towards each opposite first and second end 111, 112 in the back face 102 to allow coupling structure 125 internal of the panel shell to be coupled to external support structure, such as an I-beam 710 (FIG. 7). The coupling structure 125 may be (or be coupled to) part of one reinforcing component 101.

Figure 12:
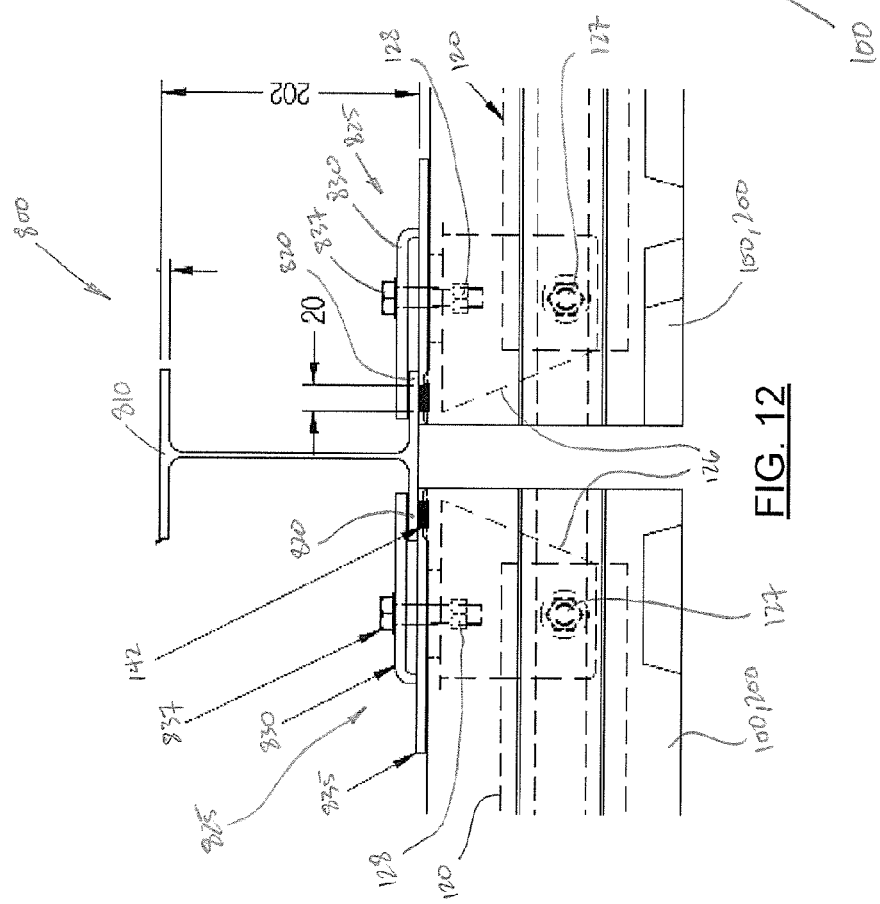
FIG. 12 is a bottom view similar to FIG. 10, but showing panels coupled to a different size support beam using a different form of coupling mechanism.

In some embodiments, reinforcing element 101 comprises an elongate bar 120, which may be formed of steel and/or another suitable metal, for example. The structure and arrangement of the reinforcing element 101 is shown in further detail in FIGS. 14A, 14B, 14C, and 14D. The elongate bar may be a steel rectangular hollow section (RHS), for example, or may in some embodiments be formed as an I-beam or other beam shape. The reinforcing component 101 shown in the drawings has a pivotable coupling element, such as a clevis 126, at each end of the elongate bar 120, pivotally coupled thereto by a coupling means, such as a bolt or clevis pin 127. Each clevis 126 is generally U-shaped in cross section and has a central aperture 129 formed in a bottom of the U-shape to allow receipt of one end of a bolt 739 (FIG. 10) or 837 (FIG. 12). The bolt 739 or 837 extends through the apertures 115 and 129 to couple the internal coupling structure 125 to an external support structure by threading into a nut 128 welded to an inner face of the U-shape. The threaded aperture of the nut 128 is generally concentric with the aperture 129. The use of clevis 126 as part of the coupling structure 125 allows a degree of movement of the elongate bar 120 relative to the support structure. This relative movement can be important in accommodating thermal expansion and/or contraction of the plastic panel walls and to avoid parts of the wall experiencing excessive load and/or stress under high wind or other extreme conditions.

In at least some embodiments, panel 100 may be coupled to the support structure only via the internal reinforcing components 101, which can allow for the plastic shell of the panel 100 to effectively float around the reinforcing structure, so that the reinforcing structure is relatively unaffected by thermal expansion and/or contraction of the plastic shell of the panel 100.

Panel 100 may also comprise at least one spacer 130 positioned within the cavity of the panel 100 and may be bonded to internal parts or wall surfaces of the front and back panel walls 104, 102. The positioning of the spacer 130 within the panel walls is most easily seen in FIGS. 4 and 6. Spacer 130 is shown in more detail in FIGS. 15A and 15B. The spacer 130 is disposed around the elongate bar 120 in order to separate the elongate bar 120 from the internal surfaces of the front and back side walls 104, 102 as those side walls are formed during the rotational molding process. The spacer 130 may perform a reinforcement function since it can act as a relatively rigid bridging element between the front and back side walls 104, 102. Each spacer 130 at least partially defines (e.g., defines) an aperture 135 sized to receive the elongate bar 120 and allow the spacer 130 to slide along the elongate bar 120 for initial placement of the spacer 130. Some sliding of the spacer 130 along the elongate bar 120 may also occur during any thermal expansion and/or contraction of the panel walls.

Each spacer 130 has opposite first and second ends 131, 132 and first and second opposed side portions 133, 134, which all together connect and thereby at least partially define (e.g., define) the aperture 135 that accommodates the elongate bar 120. The spacer 130 may, in some embodiments, be formed of a material that is chemically compatible with the plastic material used to form the shell of the panel, so that at least the end faces of first and second ends 131, 132 will melt during the rotational molding process and bond with the front and back panel walls 104, 102 as they are formed. In the rotational molding process, the spacers 130 are positioned to avoid direct contact with the mold plates. A gap is left between the mold plates and the spacer to allow the granulated plastic to melt and form the panel wall in that gap.

For each elongate reinforcing beam 120 extending within the cavity, at least one spacer 130 is positioned roughly midway between the ends 111, 112 of the panel 100. At least two more spacers 130 may be positioned along the elongate beam 120, intermediate the centrally positioned spacer 130 and each end of the panel 100. In various embodiments, 2, 3, 4, 5, or more spacers 130 may be positioned inside the panel walls for each reinforcing beam 120. If a central spacer 130 is provided, then the position of that central spacer 130 may be fixed relative to the reinforcing beam 120, for example by positioning screws, clamps, and/or other fixation means. In this way, relative movement between the panel shell and the one or more reinforcing beams 120 is generally forced to occur outwardly from the center across the length of the panel 100 due to the central anchoring of the shell to the one or more reinforcing components 101.

As shown in FIG. 15A, spacer 130 may have projections 138 that project inwardly from first and second portions 133, 134 on an inner wall of the spacer 130 that at least partially defines (e.g., defines) the aperture 135. These projections 138 may be relatively small, for example in the order of a millimeter or less when compared with the nominal rectangular inner wall surface that at least partially defines (e.g., defines) aperture 135. Such projections 138 may be somewhat curved and resemble small bumps. Projections 138 are intended to provide a small separation between the inner wall of the spacer 130 and the surface of the elongate bar 120, thereby allowing easier manual sliding (and avoiding frictional sticking) of the spacer 130 along the elongate bar 120 at the time of the positioning of the reinforcing components 101 and spacers 130 within the mold prior to the rotational molding. Multiple projections 138 may be formed at spaced intervals around the inner perimeter of the spacer 130. While projections 138 are shown in FIG. 15A as being formed on the inside walls of first and second side portions 133, 134, they may be also formed on the inside of first and second ends 131, 132.

The spacer 130 may have a length from the first end 131 to the second 132 of about 120 millimeters to about 150 millimeters, for example. The width of the spacer 130 may be about 100 millimeters to 110 millimeters and the thickness of the spacer 130 may be about 10 millimeters, for example. These dimensions may be varied according to some embodiments, in order to provide more or less bonding surface area at either of the first and second ends 131, 132 or more or less bridging strength by thickening the first and second portions 133, 134. Also, the length of the spacer 130 may be varied, depending on the desired relative separation of the front and back side walls 104, 102.

The spacer 130 may be formed of a plastic material compatible with the plastic material of the panel walls 102, 104. For example, the spacer 130 may be formed of a suitable polyolefin, such as a suitable polyethylene or polypropylene material having an appropriate melting point, stiffness, and strength. In some embodiments, the spacer 130 may be formed of non-plastic materials, such as metals. For example, the spacer 130 may be formed of light steel and/or aluminum. The shape of spacer 130 shown in the drawings and described above may be modified while still performing the same spacing and reinforcement functions as described herein. For example, metal spacers may be formed to have projections that become at least partly encased in the panel walls during wall formation in the rotational molding process. In some embodiments of the spacer 130, the spacer material need not necessarily encircle or completely surround the elongate bar 120, as long as it is reasonably securely affixed to the elongate bar 120 (while permitting relative longitudinal sliding movement).

Figure 4:
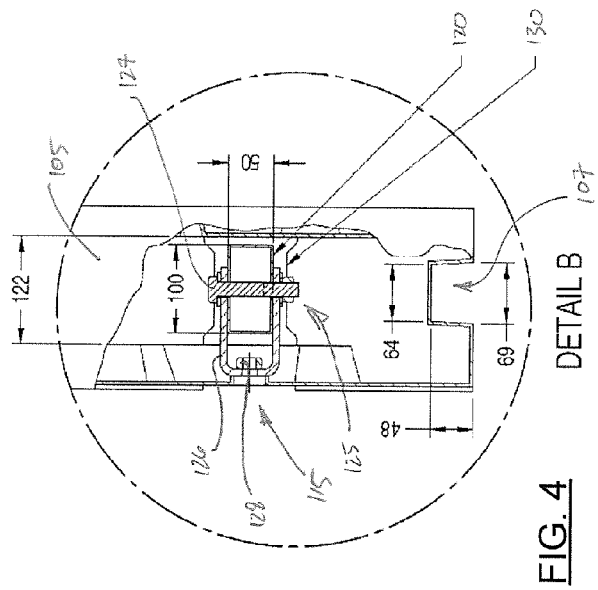
FIG. 4 is a close-up detailed view of internal panel components, shown by partial cut-away and in cross-section.
Figure 5:
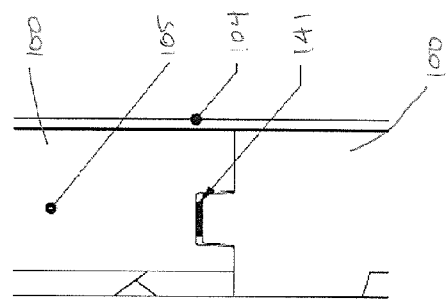
FIG. 5 is an end view illustrating vertical stacking of one panel on top of another.
Figure 3:
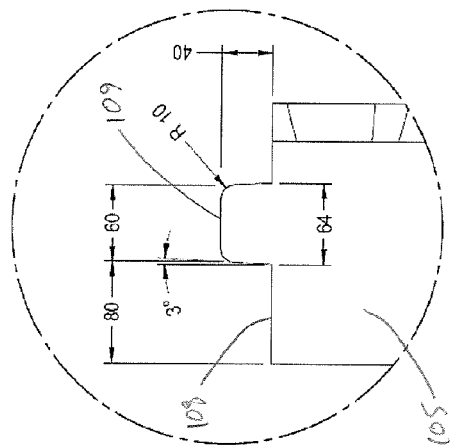
FIG. 3 is a close-up detailed view of a top edge profile of the panel of FIG. 1A.

As is shown in FIGS. 3, 4, and 5, the tongue 109 is formed as a slightly trapezoidal upward projection from the upper edge 108, with the side walls of the tongue 109 being slightly angled, for example at about 3°, relative to the vertical and tapering inwardly toward the upper face of the tongue 109. As is shown in FIG. 5, a sealing gasket 141 may be positioned as an elongate strip extending across the full length of the tongue 109 in between the top face of the tongue 109 of one panel 100 and the corresponding recessed face of the groove 107 of another panel 100. This sealing gasket 141 is to reduce any noise transmission that might occur through any small gap between the upper edge 108 of one panel 100 and the lower edge 106 of another panel 100 disposed on top of it. The recess 107 is angled inwardly toward the recessed face to provide a correspondingly shaped recess for snugly receiving the projection of the tongue 109.

As shown in FIG. 1A, panel 100 is formed during the molding process to at least partially define (e.g., define) shallow vertically extending grooves or notches 117 adjacent to each of the end faces 103, 105 on the back side face 102. These grooves or notches 117 are for receiving a sealing gasket 142 (FIG. 10), which may be a compressible elastomeric strip, for example including plastic, rubber, silicone, combinations thereof, and the like. The sealing gasket 142 is attached to the back side face 102 in the notches 117 by suitable attachment means, such as screws and/or adhesives, for example. The sealing gasket 142 is to minimize any noise transmission that otherwise might occur through a small gap between the edge of the panel 100 and the support structure to which the panel 100 is coupled.

Referring now to FIGS. 2A, 2B, 2C, and 2D, a panel 200 according to further embodiments will now be described in further detail. Panel 200 comprises a front side face 204, a back side face 202, a first end face 203 at a first end 211, a second end face 205 (substantially parallel to the first end face 203) at a second end 212, a bottom edge 206 and a substantially parallel top edge 208. The bottom edge 206 is contoured to at least partially define (e.g., define) a groove 207 and the top edge 208 is contoured to provide a correspondingly shaped tongue 209. Using corresponding tongues 209 and grooves 207, multiple panels 200 can be stacked one on top of another, with the tongues 209 and grooves 207 of the panels 200 providing mating structure for forming a stable wall. The thickness of the walls of panel 200 is nominally about 8 millimeters, although some small variation may occur across the different parts of the panel walls. Other panel embodiments may use a different nominal wall thickness, such as about 6 millimeters to about 10 millimeters, for example.

Unlike the generally straight bottom and top edges 106, 108 of panel 100, the bottom and top edges 206, 208 of panel 200 are not straight. Top and bottom edges 208, 206 have successive straight sections that are angled relative to each other, creating an overall non-linear edge profile along the long edges of panel 200.

The front face 204 may be formed to have a textured external surface 210a. The textured external surface 210a may have a stone appearance and may comprise a visually discernible pattern, such as geometric shapes and/or one or more symbols and/or parts of symbols. The one or more symbols may at least partially define (e.g., define) one or more words and/or may convey a specific meaning, for example. Similarly, back face 202 may be formed to have a textured external surface 210b. Like the textured external surface 210a, surface 210b may have a stone appearance and may comprise a visually discernible pattern, such as one or more symbols and/or parts of symbols. Such symbols and/or parts of symbols may at least partially define (e.g., define) one or more words and/or convey specific meanings. Formation of panel 200 by rotational molding allows the creation of varied visually aesthetically appealing and/or meaningful indicia and/or patterns to be provided on external exposed front and back faces 204, 202 of the panel 200, which may provide added appeal in some circumstances.

Figures 2C, 2D:
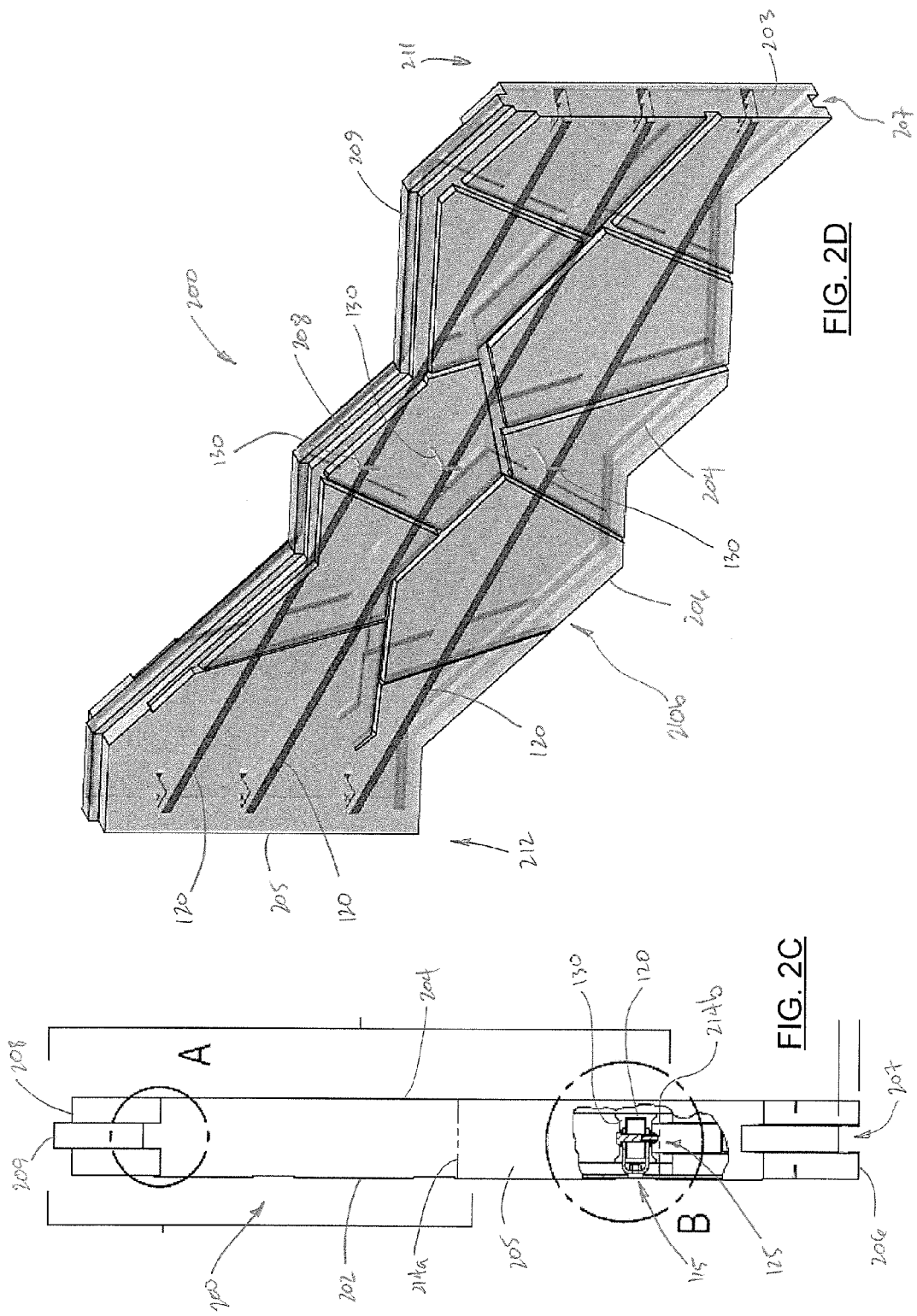
FIG. 2C is an end view of the panel of FIG. 2A, showing some internal detail of the panel in partial cut-away and partial cross-section.
FIG. 2D is an isometric view of the panel of FIG. 2A, seen from an opposite side.
Figure 6:
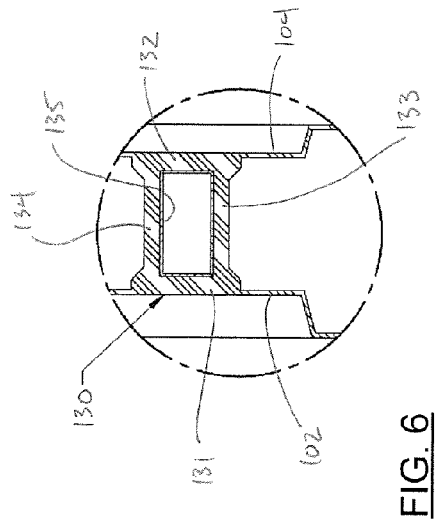
FIG. 6 is a close-up detailed view showing a spacer employed internally in a panel.

Each panel 200 has a length greater than its height and a height greater than its width when the panel 200 is oriented vertically in a normal vertical wall panel orientation as shown in FIGS. 2A and 2D. The length may be about, or just under, 4 meters (e.g., 390 to 395 cm, 395 to 400 cm, 390 to 400 cm), while the height may be about two meters from the lowest part of the bottom edge 206 to the highest part of the top edge 208, including a height of the vertically extending tongue 209. In some embodiments, the height of the panel may be between about two meters and about three meters or possibly more than three meters. The height of the tongue 209 relative to the remainder of the top edge 208 may be about 40 millimeters to about 50 millimeters, for example. The height of the panel 200 at each first and second end face 203, 205 may be about 1500 millimeters, not including the height of the tongue 209. The width of the panel 200 may be about 180 millimeters to about 210 millimeters, for example. Specific embodiments may have a width of about 190 millimeters or about 200 millimeters.

The example dimensions given here may be varied, depending upon specifications and are intended to only be generally indicative of the dimensions of some embodiments. Other embodiments can have different dimensions. For example, the panel length may be shorter, in the order of 2, 3, or 3.5 meters or other lengths in between about 2 meters and about 4 meters. The panel length may alternatively be longer than 4 meters, for example up to about 5 meters or up to about 6 meters. Panels of such longer lengths may include suitable reinforcing structure, such as is described herein, in order to tolerate high wind loads.

In some embodiments, panel 200 may be formed to have a generally straight bottom edge 206, for example where it is the bottom ground-engaging panel of a barrier wall section. Such panel embodiments may be formed using a specific mold or may be cut from a full panel 200, for example along a longitudinal line 214a or 214b, as shown in FIG. 2A.

Described embodiments of panel 200 may employ reinforcing structure, for example including one or more reinforcing elements or components 101 (FIG. 14A) as previously described. Such reinforcing structure may comprise a number of strengthening or reinforcing elements, including for example: variations in surface patterns; inwardly extending molded wall portions that may touch or be bonded together; and one or more relatively rigid reinforcing elements that extend within a cavity at least partially defined (e.g., defined) by the walls of the panel 200.

Some embodiments of panel 200 generally employ reinforcing components 101 and spacers 130 in the same or a similar way as described herein in relation to panel 100. Each panel 200 is formed to have at least one aperture in at least one of the walls. The panel 200 may have multiple apertures formed to allow communication between internal and external spaces of the panel 200. At least one such aperture may be positioned to allow communication of a coupling mechanism through the aperture to couple internal structures of the panel 200 to external support structure. Similarly to panel 100, apertures 115 are formed in the back side face 202 of panel 200 toward each opposite first and second end 211, 212 in a similar manner to panel 100 in order to allow coupling of internal coupling structure 125 to external support structure, such as I-beam 710, through the aperture 115.

While panel 100 is shown in FIG. 1A as having two reinforcing components 101 extending lengthwise therein between the first and seconds ends 111, 112, panel 200 shown in FIG. 2A may comprise three reinforcing components 101 extending lengthwise through the panel shell between the first and second ends 211, 212. In some embodiments of panel 200, two or possibly only one reinforcing element may be used instead of three. Some panel embodiments may employ only a single reinforcing component 101. Certain such embodiments may employ alternative reinforcing components to accommodate different panel dimensions and or configurations. In some panel embodiments, an aperture to allow coupling between internal coupling structure of the panel and external support structure may be formed towards the panel's center or at least more towards the panel center than at the ends. Certain such panel embodiments may be more applicable in structures that need a lesser degree of resistance to wind loads, for example.

For embodiments of panel 200 needing strong structural integrity in order to be able to withstand high wind loadings, two, three, four, five, or more reinforcing components 101 may be used. Such reinforcing components 101 are included within the mold during the rotational molding process, so that a shell comprising the outer walls of the panel 200 forms around the reinforcing components 101 during the rotational molding.

In at least some embodiments, panel 200 may be coupled to the support structure only via the internal reinforcing components 101, which can allow for the plastic shell of the panel 200 to effectively float around the reinforcing structure, so that the reinforcing structure is relatively unaffected by thermal expansion and/or contraction of the plastic shell of the panel 200.

Panel 200 may also comprise at least one spacer 130 positioned within the cavity of the panel 200 and may be bonded to internal surfaces of the front and back panel walls 204, 202 (in the same manner as is described above in relation to panel 100). The positioning of the spacer 130 within the panel walls is most easily seen in FIGS. 4 and 6.

As shown in FIG. 2A, panel 200 is formed during the molding process to at least partially define (e.g., define) shallow vertically extending grooves or notches 217 adjacent to each of the end faces 203, 205 on the back side face 202. These grooves or notches 217 are for receiving a sealing gasket 142 (FIG. 10), which may be a compressible elastomeric plastic, rubber or silicone strip, for example. The sealing gasket 142 is attached to the back side face 202 in the notches 217 by suitable attachment means, such as screws or adhesives, for example. The sealing gasket 142 is to minimize any noise transmission that otherwise might occur through a small gap between the edge of the panel 200 and the support structure to which the panel 200 is coupled.

Figure 9:
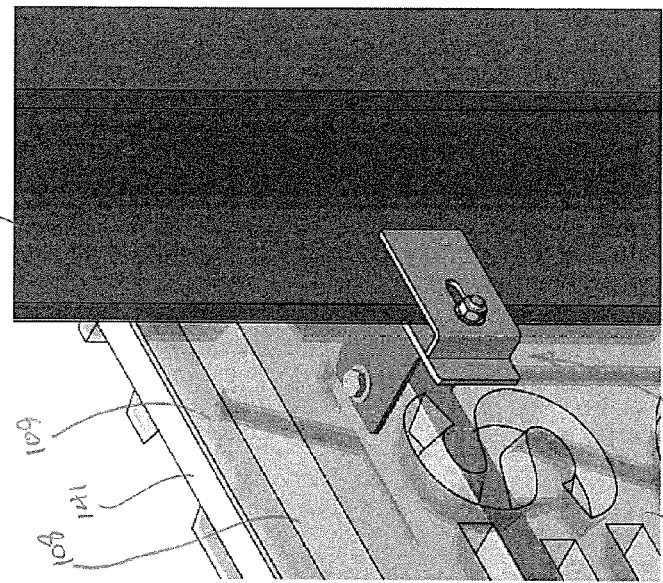
FIG. 9 is a close-up view of a coupling mechanism by which panels are coupled to support structure in the barrier according to some embodiments.
Figure 8:
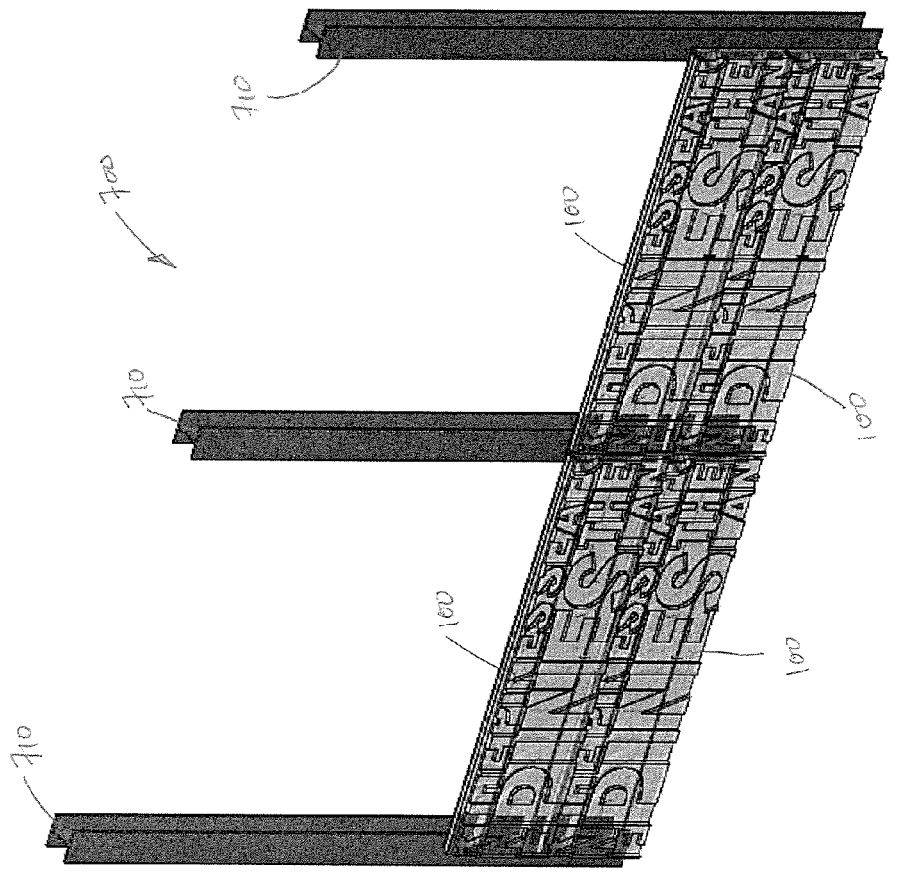
FIG. 8 is an isometric view of the barrier of FIG. 7.

Referring now to FIGS. 7, 8, 9, 10, and 11, embodiments of a barrier 700 are described in further detail. Barrier 700 comprises multiple panels 100 stacked one on top of the other and arranged to be lengthwise adjacent other stacked panels 100 to form a series of wall sections 702 along the length of barrier 700. While FIGS. 7, 8, and 9 show barrier 700 comprising multiple panels 100, the barrier 700 may in some embodiments be formed using multiple panels 200. In some embodiments of barrier 700, panels 100 and 200 may both be used, either in different wall sections 702 or possibly within the same wall section 702. For example, a panel 200 formed to have a straight bottom edge 206 but a non-linear top edge 208 may be used as the top panel of a wall section 702 otherwise comprising multiple straight panels 100 extending down to the ground.

Some embodiments of panels 100 and 200 may employ non-parallel top and bottom edges, for example giving each panel a somewhat trapezoidal appearance, with one end face being longer than the other, providing such panels can still be tiled with each other to form a wall section 702.

Although FIG. 7 shows panels 100 that each have the same indicia form on one side face, panels 100 having different indicia may be combined within the same wall section 702.

Barrier 700 comprises support structure to support the panels 100, 200 in a vertical orientation with the long dimension of the panels 100, 200 extending generally horizontally. The support structure may comprise multiple spaced beams, posts, or girders which are anchored to the ground in a secure manner in order to lend suitable supporting structure so that large wind forces impinging on the panels 100, 200 are unlikely to displace or perturb the attached panels 100, 200 and wall sections 702. I-beams 710 and 810 (FIGS. 12 and 13) are shown as examples of at least part of such support structure. Although not shown, such I-beams 710, 810 are anchored into the ground by suitable footings, for example using concrete.

As shown in FIGS. 9, 10, and 11, the barrier 700 further comprises clamping structure 725 to couple each panel 100 or 200 to the I-beam 710. Such clamping structure 725 is one form of attachment means that may be used to attach each panel to the support structure. Other forms of attachment means may be employed, such as bolts that extend through flanges of the I-beam 710 and through (or at least partly through) the panel 100, 200. Since the illustrated clamping structure 725 is a possible method of attachment, this, together with another possible form of clamping structure 825 (FIGS. 12 and 13) will be described in further detail.

Clamping structure 725 comprises a clamping plate 730 and a base plate 735. Base plate 735 is shown in further detail in FIGS. 17A, 17B and 17C, while clamping plate 730 is illustrated with reference to FIGS. 18A and 18B.

The base plate 735 has a flat, generally rectangular plate body 1710 having a first face 1712 and an opposite second face 1714. Projecting generally centrally from the first face 1712 is a keying portion 1720 that is shaped and sized to be received within aperture 115 of panel 100 or 200. The keying portion 1720 has a width slightly less than a width of apertures 115 but has a length that in the order of 10 to 40 mm shorter than the length of the apertures 115. This is to allow sliding of keying portion 1720 within apertures 115 during lengthwise expansion or contraction of the panel 100 or 200.

The keying portion 1720 at least partially defines (e.g., defines) a central aperture 1730 which communicates through the plate body 1710 to the second face 1714, as shown in FIG. 17B. Aperture 1730 is to receive a coupling bolt 739 that also extends through the aperture 129 of clevis 126 to couple the base plate 735 to the panel 100 or 200. Base plate 735 also at least partially defines (e.g., defines) a second aperture 1740 formed in the plate body 1710 and spaced longitudinally from the first aperture 1730. This second aperture 1740 is to receive a clamping bolt 737, so that the clamping plate 1730 can be clamped against the base plate 735 and simultaneously force part of the clamping plate 730 against a flange 720 of the I-beam 710. In this way, the base plate 735 and the clamping plate 730 clamp on either side of the flange 720 to secure the panel 100 or 200 in position.

Coupling structure 725 is configured to clamp panel 100 or 200 to an I-beam 710 having relatively long flanges 720. As is shown in FIG. 12 and described below, a slightly different coupling structure 825 may be used to clamp the panel 100 or 200 to an I-beam 810 having shorter lateral flanges 820. FIGS. 18A and 18B show a clamping plate 830 that can also be used as the clamping plate 730. The clamping plate 730, 830 has a generally rectangular profile, as seen in FIG. 18A, with a longitudinal slot 1820 extending generally along a longitudinal centerline of the clamping plate 730, 830. The clamping plate 730, 830 has a first end 1816 and an opposite second end 1818. The clamping plate 730, 830 has a mostly flat steel body 1810 defining an outer face 1814 and an opposite inner face 1812 with the slot 1820 extending between those two faces 1812, 1814. The slot 1820 extends more toward the second end 1818 than the first end 1816 and is sized to allow receipt of bolt 737 or 837 therethrough.

As shown in FIG. 18B, the second end 1818 of the clamping plate 730, 830 is bent or curves around through about 90° to provide at least one spacing projection 1830 to abut the base plate 735 or 835 when the bolt 737 or 837 is tightened to force the clamping plate 730, 830 towards the base plate 735, 835. The at least one spacing projection 1830 is sized to space most of the body 1810 of the clamping plate 730, 830 from the base plate 735, 835 by about the thickness of the I-beam flanges 720, 820 which generally allows a substantially parallel arrangement of the two plates 730/830, 735/835 when clamping against the I-beam flanges 720, 820.

In some embodiments, the at least one spacing projection 1830 may be formed to have a continuous end face at the second end 1818. In some embodiments, two spacing projections 1830 may be provided at each lateral side of second end 1818, between which is at least partially defined (e.g., defined) a slot 1832 with a width sized to allow the lateral width of the clamping plate 730, 830 to span across the entire width of the base plate 735, 835. In this way, one end of the base plate 735, 835 extends through the slot 1832 and spacing projections 1830 fit around each lateral side of the base plate 735, 835. This allows a degree of nesting retention or alignment of the base plate 735, 835 with the clamping plate 730, 830 in order to facilitate ease of the attachment of the clamping structure 725, 825 to the support structure and the panel 100 or 200.

Figure 13:
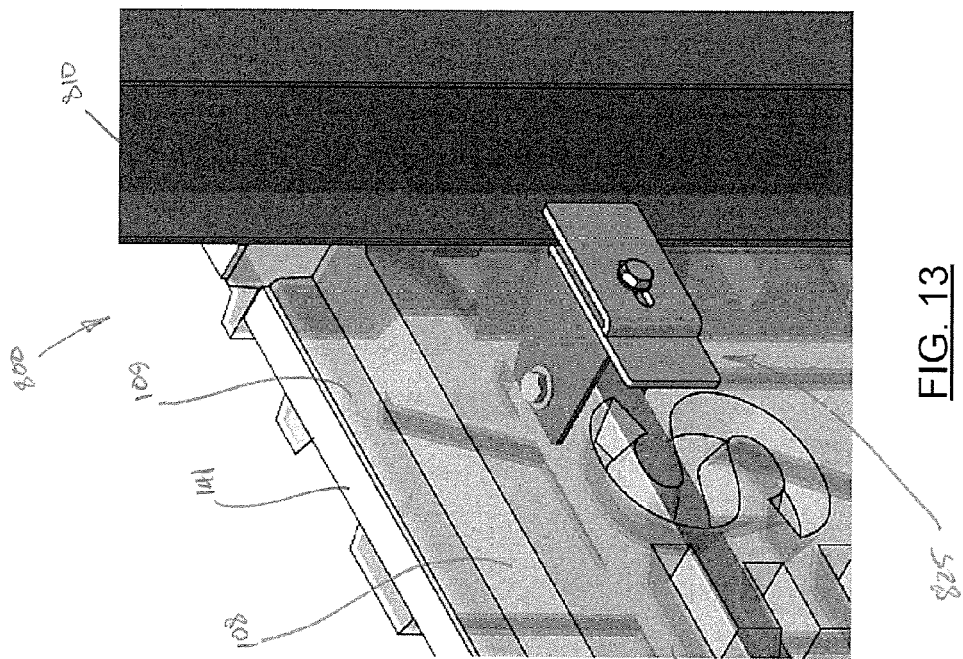
FIG. 13 is a close-up isometric view of part of the barrier with the different size support beam and the different coupling mechanism.

A perspective view of the installed clamping structure 825 is shown in FIG. 13, while FIG. 9 illustrates a perspective view of the clamping structure 725 when clamping a panel 100 to a support beam 710.

The clamping structure 825 is similar to the clamping structure 725, except that only a single bolt 837 is needed to clamp the clamping plate 830 to the base plate 835, rather than the two bolts included in clamping structure 725. The base plate 835 may include only a single central aperture 1630 extending through a keying portion 1620 that is the same as keying portion 1720. Apart from the lack of a second aperture in base plate 835, it is substantially the same as base plate 735. The differences arise in the coupling structures 725 and 825 because of the relative length of the flanges of the support structure to which they are to be coupled which, depending on that length, may allow a single clamping bolt to be used or may include the use of two bolts (as in coupling structure 725). Some embodiments may employ slightly modified clamping structure to a similar effect to the clamping structures 725, 825 described herein.

The base plate 835 has a flat, generally rectangular plate body 1610 having a first face 1612 and an opposite second face 1614. Projecting generally centrally from the first face 1612 is a keying portion 1620 that is shaped and sized to be received within aperture 115 of panel 100 or 200. The keying portion 1620 has a width slightly less than a width of aperture 115 and has a length that is in the order of 10 millimeters to 40 millimeters shorter than the length of the apertures 115. This is to allow sliding of keying portion 1620 within apertures 115 during lengthwise expansion or contraction of the panel 100 or 200.

Figure 19:
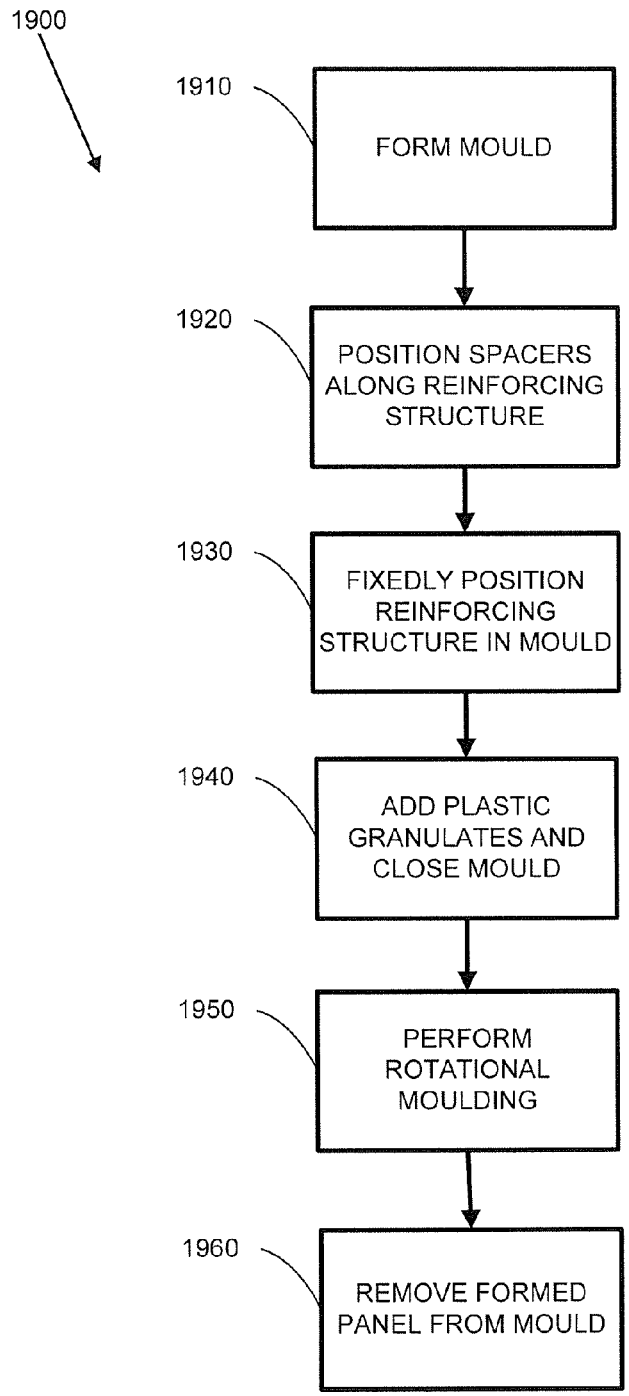
FIG. 19 is a flow chart of a method of forming a plastic panel according to some embodiments.

Referring now to FIG. 19, a method 1900 of forming a wall panel is described in further detail. At step 1910, a mold is formed. The mold may be suitable for use in rotational molding and may be formed of machined aluminum plates, for example. The mold plates are may be formed to have substantial uniform thickness from the back face of the mold to the front face of the mold in order to allow relatively uniform heat transmission through the material of the mold. Where a particular design, texture, pattern, and/or set of symbols is applied to the mold, both front and back faces of the mold plate may be machined accordingly.

At step 1920, one or more spacers 130 are positioned along the reinforcing structure. For example, spacers 130 may be slid along elongate bar 120 to a desired position. This may be done before each clevis 126 is coupled to the opposite ends of the elongate bar 120. For a panel 100 or 200 of about 4 meters in length, may be about 5 spacers 130 are positioned along the length of elongate bar 120, with at least one spacer 130 being positioned toward the lengthwise middle of the panel 100 or 200.

At step 1930, the reinforcing structure to be encased in the molded panel shell, such as one or more reinforcing elements 101, is fixedly attached to one of the mold plates, for example by suitable bolts and/or clamps. Apertures 115 may be formed by blocking out a part of the mold where the reinforcing structure couples to the mold plate. As part of step 1930, the position of the spacers 130 along the reinforcing structure may be adjusted for optimum positioning.

At step 1940, granules of a suitable polyolefin are added into the mold and the mold is closed tight. The polyolefin granules may be suitable for rotational molding and may include polypropylene and polyethylene materials, for example. An example polyolefin is polyethylene, and example forms of polyethylene include those that can accommodate pigments and ultra violet radiation stabilizers (e.g., to provide a higher resistance to degradation under exposure to ultra violet radiation). One example of a polyethylene material that can be used is Alkathene® 711 UV, available from Qenos Pty Ltd. of Altona, Victoria, Australia. Such polyethylene materials have a generally good chemical resistance to pollutants and can be more readily cleaned of graffiti than other materials, such as stone and/or concrete panel materials. Panel shells formed of such polyethylene materials may also have an anti-graffiti coating applied thereto, such as a coating available from All Purpose Protection Pty Ltd. of Keysborough, Victoria, Australia. Such polyethylene materials are also readily cleanable, for example by a water jet, and do not stain and/or burn easily. Particular forms of polyethylene that may be suitable include linear low density polyethylene and medium density polyethylene. In some embodiments, high density polyethylene may also be used. In embodiments employing polyethylene and/or polypropylene as the material for the panel shell, the polyethylene and/or polypropylene material added into the mold may include suitable additives for UV resistance and/or pigmentation and/or graffiti resistance.

Testing of sound attenuation by panels according to described embodiments has confirmed that the sound attenuation properties of such panels meet the specifications of the relevant Australian standards. For example, attenuation of sound through described panel embodiments is at least about 25 decibels at frequencies between about 250 Hz and about 5000 Hz (e.g., between 250 Hz and 5000 Hz).

At step 1950, the panel 100 or 200 is formed using conventional rotational molding techniques, including heating the mold while rotating it around two different axes of rotation so that the polyolefin granules melt and accrete on the inside surfaces of the mold plates. This heating and rotation is performed for a set period of time, following which the mold is cooled and then, at 1960, the formed panel is removed from the mold.

The method 1900 may be used to form panels of varying sizes, shapes and configurations, but for longer panels and particularly those panels over about three meters in length, each panel may include some form of reinforcing structure, for example in the form of metallic reinforcing elements and/or other non-metallic strengthening, stiffening, and/or reinforcing structure.

While described embodiments are considered to be particularly suitable for sound attenuation barriers, some embodiments are directed more generally to wall panels that can be used in different ways. For example, described embodiments may be used as panels for cladding of buildings or to form an exterior face or design on a building, since they are light, easily transportable and can be readily customized. Rotational molding of such panels can provide significant advantages over a traditional concrete panel forming.

A further possible advantage of some panel embodiments described herein is that they may be formed of a recyclable plastic that can be readily separated from the internal reinforcing structure for recycling, if desired.

Figure 20:
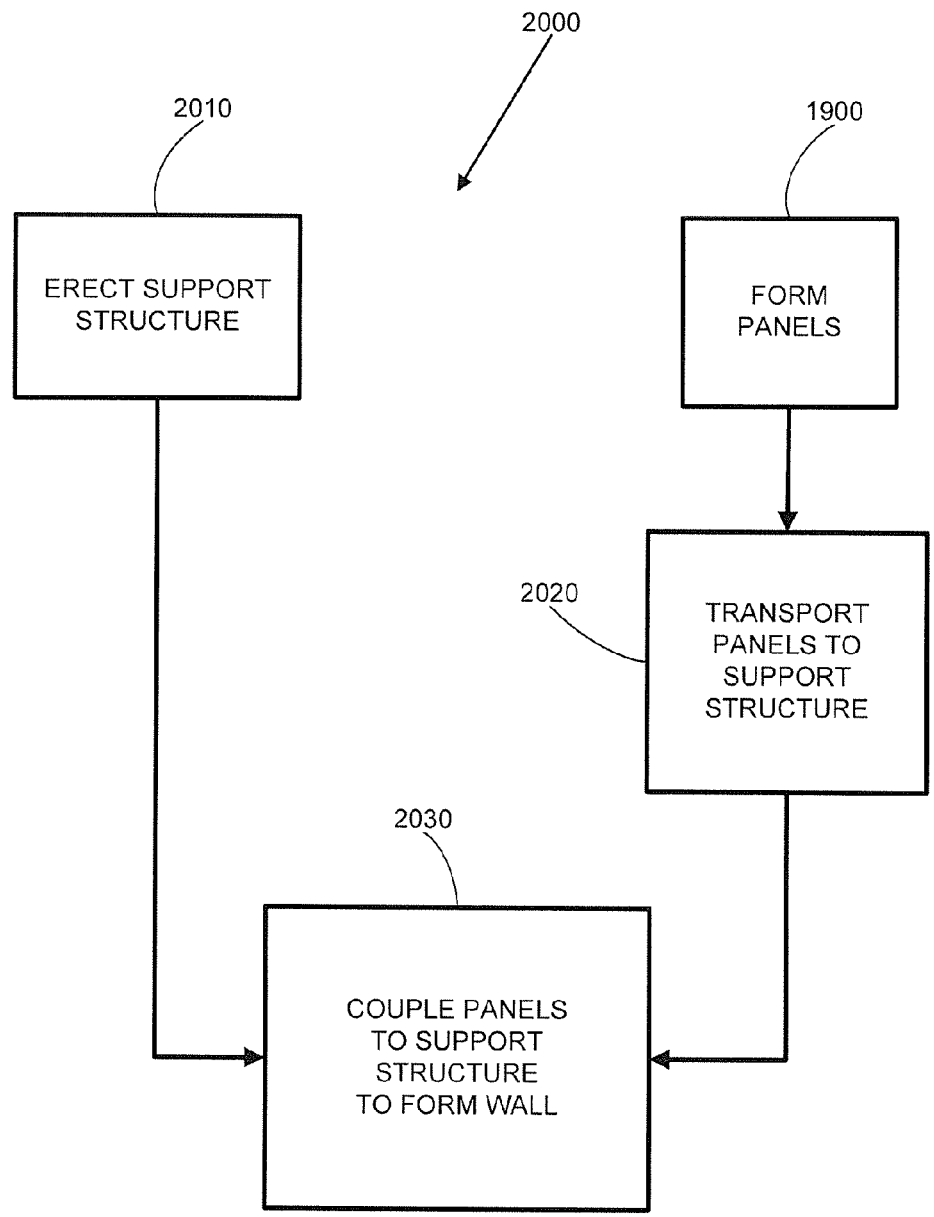
FIG. 20 is a flow chart of a method of forming a wall of panels according to some embodiments.

Referring also to FIG. 20, a method 2000 of forming a wall structure using described panel embodiments is described in further detail. Method 2000 involves the formation of panels according to method 1900. Contemporaneously with the panel formation, support structure may be erected on a chosen site at step 2010. Support structure may be formed before and/or after the panel formation. The panels, once formed, are transported to the site at step 2020, where the support structure has been erected.

At step 2030, the panels are coupled to the support structure to form a wall. As described previously, such panels may be used to form a sound attenuation barrier 700, with multiple wall sections 702. Alternatively, the wall may not be intended to function solely as a sound attenuation barrier and may form part of a building structure, such as cladding or an exterior pattern or surface of a building. The coupling of the panels at 2030 to the support structure may be as previously described, for example using coupling structure 725 or 825. In some embodiments in which only a single aperture is formed in the panel, for example towards a center of the panel, the coupling structure used to couple the panel to the desired support structure through such an aperture may be different from that shown and described herein, although such coupling structure may comprise conventional components.

Embodiments have been described generally herein by way of non-limiting example. Thus, this detailed description should be taken as illustrative and not restrictive, taking into account that some variation and/or modification of the described embodiments is possible without departing from the spirit and scope of the invention or inventions described herein.

Example Embodiments

1. A rotational-molded plastic sound attenuation barrier panel, the panel defining an internal cavity and comprising reinforcing structure disposed in the cavity.

2. The panel of embodiment 1, wherein the reinforcing structure comprises at least one reinforcing element.

3. The panel of embodiment 2, wherein the at least one reinforcing element comprises at least one elongate bar.

4. The panel of embodiment 2 or embodiment 3, wherein the at least one reinforcing element comprises two reinforcing elements.

5. The panel of embodiment 4, wherein the two reinforcing elements are substantially parallel.

6. The panel of any one of embodiments 2 to 5, wherein the at least one reinforcing element is disposed to extend substantially parallel to a longitudinal axis of the panel.

7. The panel of any one of embodiments 1 to 6, wherein the reinforcing structure comprises metallic reinforcing structure.

8. The panel of any one of embodiments 1 to 7, wherein the panel comprises coupling structure to couple the panel to support structure.

9. The panel of embodiment 8, wherein the coupling structure comprises at least one internal interface component that is coupleable to a respective clamp.

10. The panel of embodiment 8 or embodiment 9, wherein the coupling structure comprises mating structure to mate with mating structure of an adjacent panel.

11. The panel of any one of embodiments 1 to 10, wherein the panel comprises a textured external surface on at least one side face.

12. The panel of embodiment 11, wherein the panel comprises textured external surfaces on first and second opposed side faces.

13. The panel of embodiment 11 or embodiment 12, wherein the at least one textured external surface is textured to have a stone appearance.

14. The panel of any one of embodiments 11 to 13, wherein the textured external surface comprises a visually discernible pattern.

15. The panel of any one of embodiments 11 to 14, wherein the textured external surface at least partially defines one or more symbols.

16. The panel of embodiment 15, wherein the one or more symbols at least partially define one or more words.

17. The panel of any one of embodiments 1 to 16, further comprising at least one spacer to separate the reinforcing structure from side walls of the panel.

18. The panel of any one of embodiments 1 to 17, wherein the panel comprises a shell, the shell being formed of at least one polyolefin material suitable for rotational molding.

19. The panel of embodiment 18, wherein the panel is configured to accommodate thermal expansion or contraction of the shell relative to the reinforcing structure.

20. The panel of any one of embodiments 1 to 19, wherein the panel has a length greater than a height and a width less than the height when the panel is erected as part of a sound attenuation barrier.

21. The panel of embodiment 20, wherein the length is between about two meters and about six meters.

22. The panel of embodiment 21, wherein the length is about four meters.

23. The panel of any one of embodiments 1 to 22, wherein attenuation of sound through the panel is at least about 25 decibels at frequencies between about 250 Hz and about 5000 Hz.

24. The panel of any one of embodiments 1 to 23, wherein at least one long edge of the panel is linear.

25. The panel of any one of embodiments 1 to 24, wherein at least one long edge of the panel is non-linear.

26. A sound attenuation barrier, comprising:
at least one of the panels of any one of embodiments 1 to 25; and
support structure to support the at least one panel in a vertical orientation.

27. The barrier of embodiment 26, wherein the support structure comprises a plurality of anchored support beams and wherein each at least one panel is clamped to at least one support beam.

28. The barrier of embodiment 27, wherein the at least one panel is supported in relation to the support beams to allow movement of at least part of the panel relative to the support beams in response to environmental conditions.

29. The barrier of any one of embodiments 26 to 28, wherein each support beam is flanged and each panel is coupled to flanges of two support beams.

30. A method of forming a sound attenuation barrier, comprising:
positioning plural sound attenuation barrier panels of any one of embodiments 1 to 25 adjacent anchored support structure; and
affixing each sound attenuation barrier panel to the support structure.

31. The method of embodiment 30, wherein the affixing comprises clamping each sound attenuation barrier panel to the support structure without penetrating the support structure.

32. A hollow plastic wall panel having a length, a height, and a width, the length being greater than the height and the height being greater than the width, the panel defining a cavity and comprising at least one reinforcement component extending within the cavity, wherein the panel further at least partially defines at least one aperture in a wall of the panel to allow communication of an attachment mechanism through the respective aperture for coupling the panel to a support structure.

33. The panel of embodiment 32, wherein the panel is formed by rotational molding and a plastic used to form the panel is a polyolefin suitable for rotational molding.

34. The panel of embodiment 32 or embodiment 33, wherein each reinforcement component comprises an elongate bar extending in a lengthwise direction of the panel and a pivotable coupling element at each opposite end of the bar.

35. The panel of embodiment 34, wherein the panel is coupleable to the support structure by coupling of one attachment mechanism through a respective aperture to one pivotable coupling element.

36. Cladding for a building, comprising support structure and a plurality of the wall panels of embodiment 32 or embodiment 33, wherein the wall panels are coupled to the support structure to form at least part of the cladding.

37. A building exterior, comprising support structure and a plurality of the wall panels of embodiment 32 or embodiment 33, wherein the wall panels are coupled to the support structure to form at least part of the building exterior.

38. A method of forming a sound attenuation barrier panel, comprising:
receiving a quantity of granulated polyolefin in a mold that at least partially defines a shape of the panel;
fixedly positioning reinforcing structure in the mold; and
forming the granulated polyolefin into panel walls by rotational molding, wherein the panel forms around the reinforcing structure.

39. The method of embodiment 38, wherein the mold is formed to at least partially define a textured external surface on at least one outward face of the panel.

40. The panel of embodiment 39, wherein the textured external surface at least partially defines one or more symbols.

41. The method of any one of embodiments 38 to 40, wherein the forming of the panel comprises forming at least one aperture in the panel to facilitate coupling of the panel to support structure.

42. The method of embodiment 41, wherein the panel is formed to allow communication of a coupling mechanism through each aperture to couple the panel to the support structure so that load and stresses on the panel are transferred to and primarily born by the reinforcing structure.

43. The method of any one of embodiments 38 to 42, further comprising inserting spacers into the mold to space the reinforcing structure from internal surfaces of the mold.

44. The method of embodiment 43, wherein the spacers and reinforcing structure are arranged to permit relative movement therebetween.

44. The method of embodiment 43 or embodiment 44, wherein the spacers are formed of a rigid material that is chemically compatible with the polyolefin material of the panel walls to facilitate bonding of the spacers with the panel walls.

46. The method of any one of embodiments 38 to 45, wherein the panel is formed to have mating structure to mate with mating structure of an adjacent panel in a sound attenuation barrier.

47. A sound attenuation barrier comprising:
at least one hollow plastic panel;
support structure to support at least one panel in a vertical orientation as a wall element; and
a coupling system that couples an internal structural element of the at least one panel to the support structure so that the at least one panel is permitted to move relative to the support structure in response to environmental conditions.

48. A rotational molded plastic sound attenuation barrier panel, the panel having a length, a height and a width, the length being greater than the height and the height being greater than the width, wherein the length is between about four meters and about six meters.

49. The panel of embodiment 48, wherein the height is between about 0.5 meters and about 3 meters.

50. The panel of embodiment 48 or embodiment 49, wherein the width is between about 180 millimeters and about 210 millimeters.

51. The panel of any one of embodiments 48 to 50, wherein the panel has straight side edges along its length.

52. The panel of any one of embodiments 48 to 50, wherein the panel has non-linear side edges along its length.

53. The panel of any one of embodiments 48 to 52, further comprising lengthwise reinforcing means.

54. The steps, features, elements, acts, compositions, modules, components, examples, arrangements and structure described or depicted herein, individually or in any combination or sub-combination thereof.

The invention claimed is:

1. A rotational-molded plastic sound attenuation barrier panel, the panel having walls defining an internal cavity and comprising reinforcing structure disposed in the cavity wherein the walls include front and back walls, wherein the panel further defines at least one aperture in the back wall of the panel to allow communication of an attachment mechanism through the respective aperture for coupling the reinforcement component to a support structure, and wherein a thickness of the front and back walls and a gap between the front and back walls are configured to attenuate sound through the panel by at least about 25 decibels at frequencies between 250 Hz and 5000 Hz.

2. The panel of claim 1, wherein the reinforcing structure comprises at least one reinforcing element.

3. The panel of claim 2, wherein the at least one reinforcing element comprises at least one elongate bar.

4. The panel of claim 2, wherein the at least one reinforcing element comprises two reinforcing elements.

5. The panel of claim 4, wherein the two reinforcing elements are substantially parallel.

6. The panel of claim 2, wherein the at least one reinforcing element is disposed to extend substantially parallel to a longitudinal axis of the panel.

7. The panel of claim 1, wherein the reinforcing structure comprises metallic reinforcing structure.

8. The panel of claim 1, wherein the panel comprises coupling structure to couple the panel to support structure.

9. The panel of claim 8, wherein the coupling structure comprises at least one internal interface component that is coupleable to a respective clamp.

10. The panel of claim 8, wherein the coupling structure comprises mating structure to mate with mating structure of an adjacent panel.

11. The panel of claim 1, wherein the panel comprises a textured external surface on at least one side face.

12. The panel of claim 11, wherein the panel comprises textured external surfaces on first and second opposed side faces.

13. The panel of claim 11, wherein the at least one textured external surface is textured to have a stone appearance.

14. The panel of claim 11, wherein the textured external surface comprises a visually discernible pattern.

15. The panel of claim 11, wherein the textured external surface at least partially defines one or more symbols.

16. The panel of claim 15, wherein the one or more symbols at least partially define one or more words.

17. The panel of claim 1, further comprising at least one spacer to separate the reinforcing structure from side walls of the panel.

18. The panel of claim 1, wherein the panel comprises a shell, the shell being formed of at least one polyolefin material suitable for rotational molding.

19. The panel of claim 18, wherein the panel is configured to accommodate thermal expansion or contraction of the shell relative to the reinforcing structure.

20. The panel of claim 1, wherein the panel has a length greater than a height and a width less than the height when the panel is erected as part of a sound attenuation barrier.

21. The panel of claim 20, wherein the length is between about two meters and about six meters.

22. The panel of claim 21, wherein the length is about four meters.

23. The panel of claim 1, wherein at least one long edge of the panel is linear.

24. The panel of claim 1, wherein at least one long edge of the panel is non-linear.

25. A sound attenuation barrier, comprising:
at least one of the panels of claim 1; and
support structure to support the at least one panel in a vertical orientation.

26. The barrier of claim 25, wherein the support structure comprises a plurality of anchored support beams and wherein each at least one panel is clamped to at least one support beam.

27. The barrier of claim 26, wherein the at least one panel is supported in relation to the support beams to allow movement of at least part of the panel relative to the support beams in response to environmental conditions.

28. The barrier of claim 25, wherein each support beam is flanged and each panel is coupled to flanges of two support beams.

* * * * *